US009722826B2

(12) United States Patent
Gao et al.

(10) Patent No.: US 9,722,826 B2
(45) Date of Patent: Aug. 1, 2017

(54) ENHANCING MODULATION AND CODING SCHEME SELECTION AND MEDIUM ACCESS CONTROL (MAC) PROTOCOL DATA UNIT AGGREGATION USING MAC EFFICIENCY INFORMATION

(71) Applicant: QUALCOMM Incorporated, San Diego, CA (US)

(72) Inventors: Qinghai Gao, Sunnyvale, CA (US); Xiaolong Huang, San Jose, CA (US); Vincent Knowles Jones, IV, Redwood City, CA (US); Srinivas Katar, Fremont, CA (US); James Simon Cho, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 14/542,464

(22) Filed: Nov. 14, 2014

(65) Prior Publication Data

US 2016/0142232 A1    May 19, 2016

(51) Int. Cl.
*H04L 27/00* (2006.01)
*H04L 1/16* (2006.01)
*H04L 1/00* (2006.01)

(52) U.S. Cl.
CPC ........ *H04L 27/0008* (2013.01); *H04L 1/0003* (2013.01); *H04L 1/0007* (2013.01);
(Continued)

(58) Field of Classification Search
CPC combination set(s) only.
See application file for complete search history.

(56) References Cited

U.S. PATENT DOCUMENTS

| 2005/0135295 A1* | 6/2005 | Walton | H04W 74/0816 370/328 |
| 2008/0080437 A1* | 4/2008 | Krishnaswamy | H04L 1/0003 370/338 |

(Continued)

OTHER PUBLICATIONS

ISA/EPO, International Search Report and Written Opinion of the International Searching Authority, Int'l. App. No. PCT/US2015/060432, Feb. 22, 2016, European Patent Office, Rijswijk, NL, 13 pgs.

(Continued)

*Primary Examiner* — Yee Lam
(74) *Attorney, Agent, or Firm* — Holland & Hart LLP

(57) ABSTRACT

Methods, systems, and devices are described for wireless communications. More particularly, the described features relate to techniques for adjusting a modulation and coding scheme (MCS) to account for different airtime utilizations (available airtime actually utilized by a device for transmissions) resulting from different MCSs. In one example, a method for wireless communication may involve: determining a media access control (MAC) efficiency for a station of a plurality of stations based at least in part on a real-time multi-user (MU) physical protocol data unit (PPDU) length, a real-time physical layer service data unit (PSDU) length of each of the plurality of stations, and a modulation and coding scheme (MCS) of the station; adjusting a goodput estimate of the station using the MAC efficiency; and, adjusting the MCS of the station using the adjusted goodput estimate.

19 Claims, 15 Drawing Sheets

(52) U.S. Cl.
CPC .......... *H04L 1/0009* (2013.01); *H04L 1/0015* (2013.01); *H04L 1/1614* (2013.01)

(56) References Cited

U.S. PATENT DOCUMENTS

| | | | |
|---|---|---|---|
| 2009/0303871 | A1 | 12/2009 | Kim et al. |
| 2010/0046437 | A1* | 2/2010 | Nishibayashi ........ H04L 1/1614 370/328 |
| 2011/0069648 | A1 | 3/2011 | Lee et al. |
| 2012/0117446 | A1 | 5/2012 | Taghavi et al. |
| 2012/0314636 | A1* | 12/2012 | Liu .................... H04W 28/065 370/311 |
| 2013/0136078 | A1 | 5/2013 | Bucknell et al. |
| 2013/0315260 | A1* | 11/2013 | Adiraju .................. H04L 47/62 370/415 |
| 2014/0169195 | A1 | 6/2014 | Hsin et al. |
| 2014/0219111 | A1 | 8/2014 | Du et al. |
| 2014/0254408 | A1 | 9/2014 | Shukla et al. |
| 2014/0254424 | A1 | 9/2014 | Gao et al. |
| 2014/0269752 | A1 | 9/2014 | Bhanage et al. |
| 2015/0063128 | A1* | 3/2015 | Garikipati ............ H04B 7/0417 370/252 |
| 2015/0092652 | A1 | 4/2015 | Ramamurthy et al. |
| 2015/0249936 | A1* | 9/2015 | Chen .................. H04W 28/065 370/329 |
| 2016/0142176 | A1 | 5/2016 | Gao et al. |

OTHER PUBLICATIONS

Skordoulis et al., "IEEE 802.11n MAC Frame Aggregation Mechanisms for Next-Generation High-Throughput WLANs," IEEE Wireless Communications, Feb. 2008, pp. 40-47, vol. 15, Issue 1, ISSN 1536-1284, XP_11204551A, Institute of Electrical and Electronics.

\* cited by examiner

ENHANCING MODULATION AND CODING SCHEME SELECTION AND MEDIUM ACCESS CONTROL (MAC) PROTOCOL DATA UNIT AGGREGATION USING MAC EFFICIENCY INFORMATION

BACKGROUND

Field of the Disclosure

The present disclosure, for example, relates to wireless communication systems, and more particularly to selection or adjustment of a modulation and coding scheme (MCS).

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a Wireless Local Area Network (WLAN), such as a Wi-Fi network (IEEE 802.11) may include an access point (AP) that may communicate with one or more stations (STAs) or mobile devices. The AP may be coupled to a network, such as the Internet, and enable a mobile device to communicate via the network (and/or communicate with other devices coupled to the access point).

As communications technology has evolved, faster PHY transmission rates are possible. For example, the use of orthogonal frequency-division multiplexing (OFDM) modulation techniques, enhanced modulation and coding schemes (MCSs), and the use of multiple-input multiple-output (MIMO) antennas are among the examples of technology that have increased the physical layer transmission rates achievable by a communications channel. In addition to faster transmission rates, improvements in media access control (MAC) protocols have also increased throughput. In particular, reducing MAC protocol overhead has shown to improve throughput in communication systems. For example, frame aggregation is a process of arranging several MAC protocol data units (MPDUs) together into a single PHY transmission frame. Having fewer PHY transmission frames may be preferable in some communication systems that define a contention process between PHY frames, interframe spacing, or PHY transmission frame headers (e.g., PHY overhead).

An MCS may be selected using an algorithm for calculating goodput. The algorithm may assume that transmissions under various MCS each utilize a same amount of airtime for data transmission. However, this assumption may be inaccurate in some instances.

SUMMARY

For an MCS that yields a higher packet error rate (PER), a likelihood that some MPDUs in an aggregated MPDU (AMPDU) fail in a transmission may increase for an MCS that yields a higher packet error rate (PER). Thus, different MCSs may result in different airtime utilizations (available airtime actually utilized by a device for transmissions). Accordingly, a poorly selected MCS may result in poor throughput. Multiple approaches for addressing this problem are described herein.

A method for wireless communication is described. The method may be implemented for a plurality of stations. The method may involve determining a media access control (MAC) efficiency for a wireless device based at least in part on a real-time multi-user (MU) physical protocol data unit (PPDU) length, a real-time physical layer service data unit (PSDU) length of each of the plurality of users, and a modulation and coding scheme (MCS) of the wireless device. A goodput estimate of the wireless device may be adjusted using the MAC efficiency. The MCS of the wireless device may be adjusted using the adjusted goodput estimate.

The method may involve storing a set of aggregated MAC protocol data unit (AMPDU) size constraint statistics for the MCS of the station associated with head-of-line blocking. The set of AMPDU size constraint statistics may be based at least in part on a parameter from the group consisting of: a statistical packet error rate of the MCS and a maximum AMPDU size of the MCS for a given airtime.

The method also may involve determining an average physical protocol data unit (PPDU) length of the station based at least in part on the AMPDU size constraint statistics for the MCS. Alternatively or additionally, the average PPDU length of the station further may be based at least in part on an expected length of a multi-user PPDU frame. Alternatively or additionally, the average PPDU length of the station further may be based at least in part on a distribution of the AMPDU size constraint statistics for the MCS of the station.

Adjusting the goodput estimate of the station may involve: obtaining a packet error rate (PER) for the MCS of the station; and, determining a second goodput estimate of the station from a first goodput estimate, the packet error rate for the MCS of the station, and the MAC efficiency of the station.

Determining the MAC efficiency of the station further may be based at least in part on a current interframe spacing. Alternatively or additionally, determining the MAC efficiency of the station further may be based at least in part on a multi-user block ACK request frame length. Alternatively or additionally, determining the MAC efficiency of the station further may be based at least in part on an ACK frame length.

An apparatus for wireless communication is described. The apparatus may include: means for determining a media access control (MAC) efficiency for a station of a plurality of stations based at least in part on a real-time multi-user (MU) physical protocol data unit (PPDU) length, a real-time physical layer service data unit (PSDU) length of each of the plurality of stations, and a modulation and coding scheme (MCS) of the station; means for adjusting a goodput estimate of the station using the MAC efficiency; and, means for adjusting the MCS of the station using the adjusted goodput estimate. The apparatus may include these or other elements configured to carry out various operations of the methods described above and herein.

Another apparatus for wireless communication is described. The apparatus may include a processor and memory. The memory may store computer-executable code for wireless communication. The code may be executable by the processor to cause the apparatus to: determine a MAC efficiency for a station of a plurality of stations based at least in part on a real-time multi-user (MU) physical protocol data unit (PPDU) length, a real-time physical layer service data unit (PSDU) length of each of the plurality of stations, and a modulation and coding scheme (MCS) of the station; adjust a goodput estimate of the station using the MAC efficiency; and, adjust the MCS of the station using the adjusted goodput estimate. The apparatus may include these or other elements configured to carry out various operations of the methods described above and herein.

A non-transitory computer-readable medium is described. The medium may store computer-executable code for wireless communication. The code may be executable by a processor to cause a device to: determine a media access control (MAC) efficiency for a station of a plurality of stations based at least in part on a real-time multi-user (MU) physical protocol data unit (PPDU) length, a real-time physical layer service data unit (PSDU) length of each of the plurality of stations, and a modulation and coding scheme (MCS) of the station; adjust a goodput estimate of the station using the MAC efficiency; and, adjust the MCS of the station using the adjusted goodput estimate. The code may be executable by the processor to cause the device to perform these or other various operations of the methods described above and herein.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
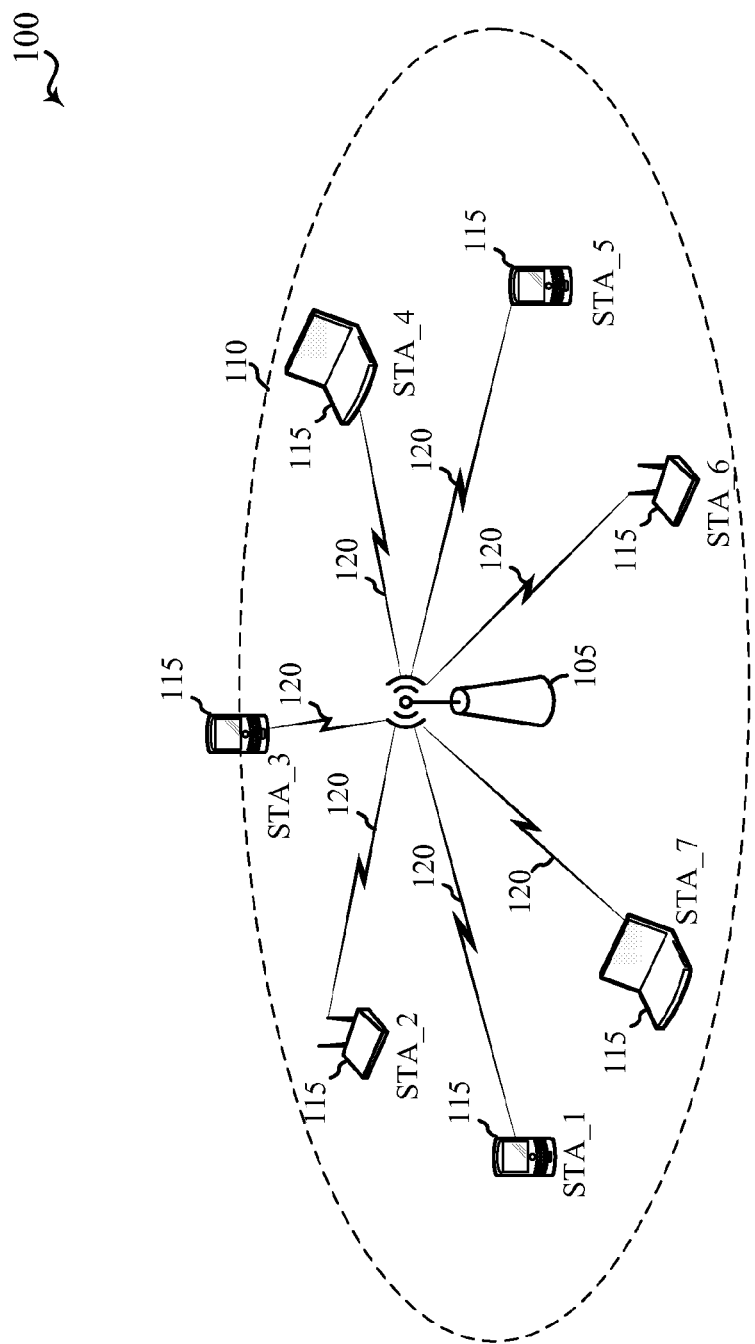
FIG. 1 shows a block diagram of a wireless communication system, in accordance with various aspects of the present disclosure.

For an MCS that yields a higher packet error rate (PER), a likelihood that some MPDUs in an aggregated MPDU (AMPDU) fail in a transmission may increase for an MCS that yields a higher packet error rate (PER). Thus, different MCSs may result in different airtime utilizations. Accordingly, a poorly selected MCS may result in poor throughput. As used herein, airtime utilization refers to the available airtime (e.g., allocated transmission time) actually utilized by a device for transmissions.

For example, PER-induced head-of-line (HOL) blocking may contribute to low airtime utilization. An MCS that yields a higher PER, may result in HOL blocking, which, in turn, may result in a smaller number of media access control (MAC) protocol data units (MPDUs) aggregated in an aggregated MPDU (AMPDU). Such smaller AMPDUs may result in smaller physical protocol data units (PPDUs). Smaller PPDUs may have greater channel access overhead and, consequently, may reduce airtime utilization. Accordingly, MCS selection may affect airtime utilization.

One solution described herein may involve determining a MAC efficiency for a wireless device. The MAC efficiency may be determined based at least in part on a real-time multi-user (MU) physical protocol data unit (PPDU) length, a real-time physical layer service data unit (PSDU) length of each of a plurality of stations, and a modulation and coding scheme (MCS) of the wireless device. A goodput estimate of the wireless device may be adjusted using the MAC efficiency. The MCS of the wireless device may be adjusted using the adjusted goodput estimate.

Another solution may involve communicating with a wireless device using a first MCS. An under-utilization of an MPDU aggregation of the wireless device may be identified while using the first MCS. The under-utilization may be caused by PER-induced HOL blocking. The method further may involve switching to a second MCS that is lower than the first MCS.

Another solution may involve identifying an under-utilization of an MPDU aggregation of a wireless device while using a first MCS. A block acknowledgement (Block ACK) may be received in response to an AMPDU transmission by the wireless device using the first MCS. A PER may be determined from the Block ACK, and may be compared to a threshold PER. The method further may involve switching to a second MCS that is lower than the first MCS when the determined PER satisfies the threshold PER.

Another solution may involve identifying a smallest AMPDU size among a plurality of stations using a first MCS. A multi-user (MU) physical protocol data unit (PPDU) length may be determined for the first MCS using the smallest AMPDU size.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a block diagram illustrates an example of a WLAN network 100 such as, e.g., a network implementing at least one of the IEEE 802.11 family of standards. The WLAN network 100 may include an access point (AP) 105 and multiple associated wireless devices or stations (STAs) 115, such as smartphones, personal digital assistants (PDAs), other handheld devices, netbooks, notebook computers, tablet computers, laptops, display devices (e.g., TVs, computer monitors, etc.), printers, etc. The stations 115 are identified as STA_1, STA_2, STA_3, STA_4, STA_5, STA_6, and STA_7 in FIG. 1. The WLAN network 100, however, may have more or fewer stations 115 than those shown in FIG. 1 since the number shown is simply for illustrative purposes. Also, while one AP 105 is illustrated, the WLAN network 100 may have multiple APs 105. Each of the STAs 115, which may also be referred to as mobile stations (MSs), mobile devices, access terminals (ATs), user equipment (UE), subscriber stations (SSs), or subscriber units, may associate and communicate with the AP 105 via a communication link 120. Each AP 105 has a geographic coverage area 110 such that STAs 115 within that area may typically communicate with the AP 105. The STAs 115 may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. The STAs 115 may be dispersed throughout the geographic coverage area 110, and each may be stationary or mobile.

Although not shown in FIG. 1, a STA 115 may be covered by more than one AP 105 and may therefore associate with one or more APs 105 at different times. A single AP 105 and an associated set of stations may be referred to as a basic service set (BSS). An extended service set (ESS) is a set of connected BSSs. A distribution system (DS) (not shown) may be used to connect APs 105 in an extended service set. The geographic coverage area 110 for an AP 105 may be divided into sectors (not shown) making up a portion of the coverage area. The WLAN network 100 may include APs 105 of different types (e.g., metropolitan area, home network, etc.), with varying sizes of coverage areas and overlapping coverage areas for different technologies. Although not shown, other wireless devices may communicate with the AP 105.

The AP 105 may implement an MCS for communicating with one of the STAs 115 (e.g., single user (SU) mode) or with a plurality of the STAs 115 (e.g., multi-user (MU) mode). The MCS may be selected from a set of indexed MCSs. Each MCS (e.g., MCS 0 through MCS 9) may have an associated transmission or data rate. Further, each MCS may have an associated PER.

As discussed above, a current approach for selecting an MCS may not always yield efficient airtime utilization, and thus may not achieve an acceptable throughput. Thus, the current approach may be modified or other approaches may be implemented to increase airtime utilization and throughput.

Figure 2:
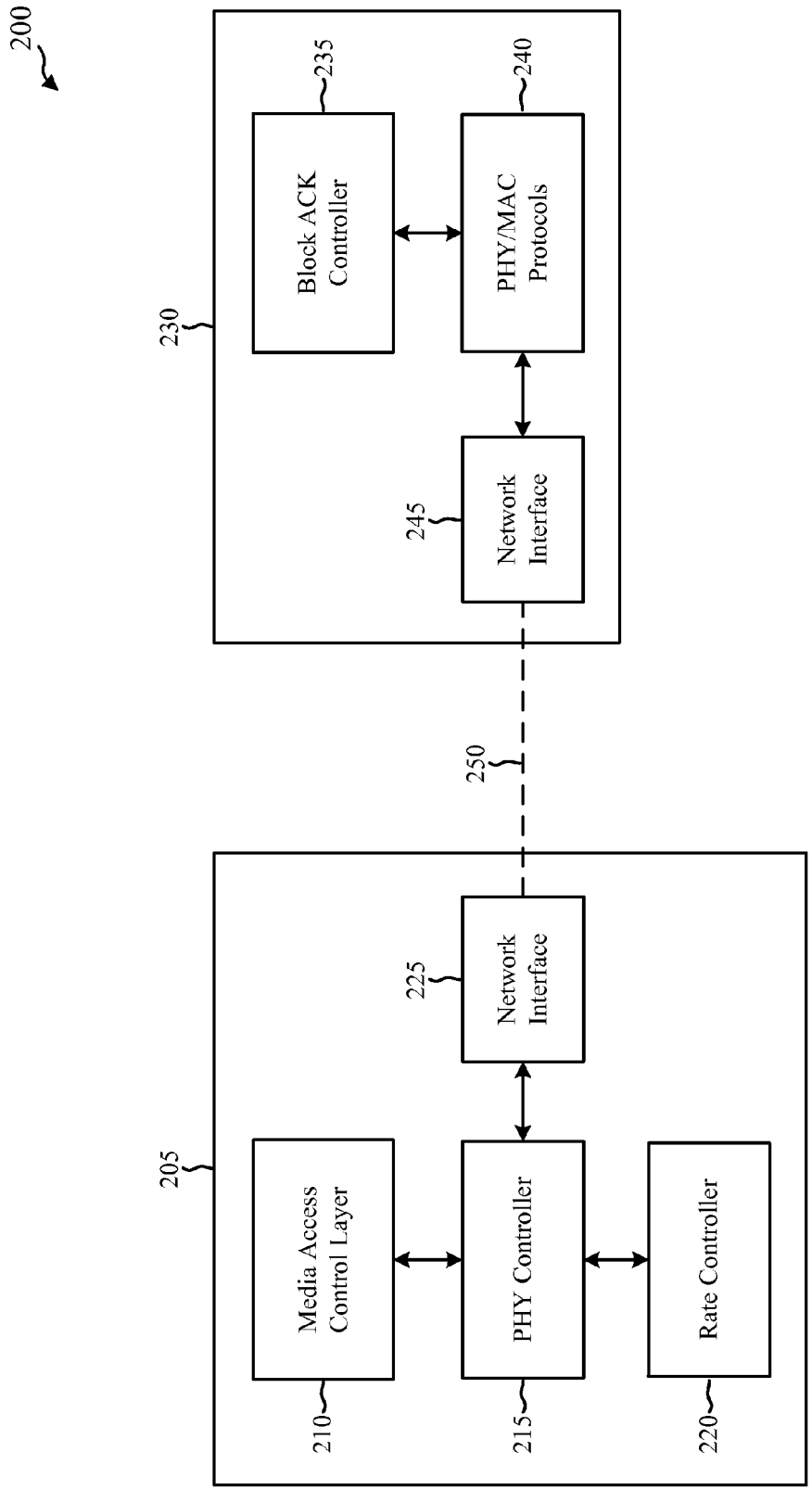
FIG. 2 shows a block diagram of another wireless communication system, in accordance with various aspects of the present disclosure.

Turning now to FIG. 2, a wireless communication system 200 may include an AP 205, such as the AP 105 described with respect to FIG. 1. The AP 205 may include a media access control (MAC) layer 210, a physical (PHY) controller 215, a rate controller 220 and a network interface 225. The MAC layer 210 may include functionality to implement frame aggregation and cause an AMPDU frame to be transmitted via the network interface 225.

Conventionally, the rate controller 220 may adjust the PHY transmission rate based on channel conditions, such as bit error rate (BER), signal-to-noise ratio, or power limitations. The rate controller 220 may select or adjust the modulation and coding scheme (MCS) used for transmissions. For example, different MCSs may be associated with different data transmission rates. The use of an MCS involves the coding of data into symbols in a modulation scheme. A greater number of symbols may allow for a greater number of bits to be represented by each symbol. Therefore, a higher MCS indicates modulation using greater numbers of bits for each symbol. A higher MCS may be associated with a higher PHY transmission rate because more data may be communicated in each transmission.

The wireless communication system 200 may include a STA 230, such as one of the STAs 115 described with respect to FIG. 1. The STA 230 may include a block acknowledgement (Block ACK) controller 235, PHY/MAC protocols 240 and a network interface 245. The network interface 245 may be coupled to a communications channel 250 for communications between the STA 230 and the AP 205 via the network interface 225. In one example, the communications channel 250 is a WLAN wireless channel configured for IEEE 802.11e, IEEE 802.11n, IEEE 802.11ac or other types of WLAN protocols which utilize frame aggregation techniques.

The AP 205 may transmit an AMPDU frame to the STA 230 via the communications channel 250 using a first MCS. In response, the Block ACK controller 235 may generate a BA frame to indicate acknowledgement/non-acknowledgement (ACK/NAK) for a series of MPDUs included in the received AMPDU frame. The BA frame may be transmitted from the STA 230 to the AP 205 via the communications channel 250.

According to one solution described herein, the rate controller 220 may be configured to adjust the MCS (e.g., select a different MCS) based at least in part upon a MAC efficiency determined for the STA 230 using the first MCS. The rate controller 220, or another component of the AP 205 such as a processor (not shown), may determine the MAC efficiency based at least in part on a real-time multi-user (MU) physical protocol data unit (PPDU) length, a real-time physical layer service data unit (PSDU) length of each of the plurality of STAs, and the first MCS. Thus, the MAC efficiency may be determined using the BA and other information.

In certain scenarios, existing rate control approaches may choose an overly aggressive rate when determining which MCS should be used for an AMPDU frame transmission. For example, existing algorithms typically use either a maximum theoretical PHY or user datagram protocol (UDP) throughput rate associated with the MCS under consideration as a peak throughput rate, and then calculates throughput as:

goodput=peak_throughput*(1−PER), where peak_throughput is the maximum or theoretical peak PHY or UDP throughput rate (e.g., MCS data rate), and goodput is an estimate based on peak_throughput as reduced by a PER experienced by a previous AMPDU transmission. As noted above, this goodput estimate may be affected by the potentially inaccurate assumption that transmissions under various MCS each utilize a same amount of airtime for data transmission. For example, the assumption may be that a maximum aggregation size may be used for all transmissions. However, actual achievable aggregation size over a series of AMPDU frame transmission may decrease as PER increases.

Thus, the goodput estimate may be adjusted by taking into account the MAC efficiency under different MCSs. In the foregoing case, the goodput estimate may be adjusted as:

adjusted goodput=(goodput*MAC efficiency), where the MAC efficiency for a particular MCS is used to determine the adjusted goodput for that particular MCS. The MCS of the wireless device may be adjusted using the adjusted goodput estimate.

Offline or online statistics may be obtained regarding the limited aggregation (e.g., AMPDU size) caused by HOL blocking under the PER of each MCS, e.g., relative to the associated or maximum AMPDU size for each MCS under a specific maximum airtime. The average length of the PPDU of the wireless device in time may be determined online (e.g., in real-time) based on a distribution of the limited aggregation (e.g., AMPDU size) of the wireless device. The PPDU efficiency of the wireless device may be estimated as the average length of the PPDU of the wireless device in time divided by an expected length of the MU PPDU frame in time (e.g., the associated or maximum AMPDU size for the particular MCS). This may be considered to be an estimated MAC efficiency. Alternatively, the MAC efficiency also may take into account inter-frame spaces, a length of an MU Block ACK request frame and a length of the Block ACK frame.

As described above, the rate controller 220 may determine the MCS (and thus the transmission rate) based at least in part on the MAC efficiency adjusted goodput estimate for different MCSs. For example, if a higher MCS results in greater MPDU failures, then the MAC efficiency and the adjusted goodput estimate would be smaller, resulting in a lower throughput. In such case, the rate controller 220 may select a lower MCS. Even though the lower MCS may have a lower data rate, the lower MCS may result in a greater MAC efficiency and higher throughput.

According to another solution described herein, inefficient aggregation may be directly detected. Upon such detection, the rate controller 220 may switch to a lower MCS. Some current approaches may monitor and use PER as a guide to MCS selection. However, PER is an indirect factor, which may introduce some inaccuracy into the MCS selection.

Inefficient aggregation may be detected by determining that a lower-than-expected goodput results from using a particular MCS. Alternatively, an actual AMPDU size may be compared with an associated or maximum AMPDU size for the particular MCS. The actual goodput or the actual AMPDU size may be determine in real time, which may result in a more dynamic and efficient selection of the MCS to use. In some cases, inefficient aggregation may be detected based on the AMPDU size in time (e.g., average AMPDU size) and the total PPDU size in time (e.g., average PPDU size), without determining a MAC efficiency as in the previously described solution.

According to another solution, a PER indicated by a Block ACK (e.g., Block ACK-signaled PER) may be used in selecting an MCS. Other measures of PER may exist, but may not be as useful for MCS selection. The Block ACK-signaled PER may be compared to a threshold, such that a lower MCS may be selected when the Block ACK-signaled PER exceeds a threshold for an MCS currently being used. The threshold may be set lower for an MCS having a larger maximum or associated AMPDU size. Alternatively or additionally, the threshold may be set lower for operation in an MU mode than for operation in a SU mode.

According to another solution described herein, inefficient MU transmissions may be stopped, for example, by using a AMPDU size for MU transmissions that is determined from the AMPDU sizes (e.g., in time) of the respective STAs (e.g., STAs 230). For example, the AMPDU size for MU transmissions may be determined to be a smallest of the AMPDU sizes of the respective users.

Alternatively, the STA (e.g., STA 230) having the smallest AMPDU size may be removed from the MU transmissions, with the AMPDU size for the MU transmissions being determined from among the AMPDU sizes of the remaining STAs (e.g., the smallest remaining AMPDU size). Such an approach may be implemented iteratively, for example, until an acceptable AMPDU size for the MU transmissions is achieved. Also, such an approach may be used to remove the STA(s) having AMPDU size(s) that are comparatively small relative to the AMPDU sizes of STAs that are more closely aligned.

Alternatively, the AMPDU sizes of the STAs may be compared to a threshold, with the user(s) having AMPDU size(s) not meeting the threshold being removed from the MU transmissions and the AMPDU size for the MU transmissions being determined from among the AMPDU sizes of the remaining users (e.g., the smallest remaining AMPDU size).

In general, the wireless communication system 200 may operate as follows. The AP 205 transmits a first quantity of MPDUs using frame aggregation. The quantity of MPDUs is included in an AMPDU transmission from the AP 205 to the STA 230 via the communications channel 250. The MAC layer 210 may implement such frame aggregation. In an example, the AMPDU transmission may include 64 MPDUs in a single AMPDU PHY-level frame.

The STA 230 sends a block acknowledgement (BA) frame indicating which MPDUs failed. The BA frame may be generated by the Block ACK controller 235. Alternatively, the BA frame may be generated by a communications unit, network interface component, processor, or other suitable component(s) of the STA 230.

The BA frame may be sent in response to a block acknowledgement request (BAR) frame from the AP 205 to the STA 230 following the AMPDU transmission. Alternatively, the STA 230 automatically may send a BA frame for each AMPDU transmission that the STA 230 receives. The BA frame may include a bitmap in which each bit represents an acknowledgement (ACK) or non-acknowledgement (NAK) of one of the MPDUs in the AMPDU transmission.

For example, the bitmap may be 64 bits long, each bit representing one of the 64 MPDUs that was included in the received AMPDU transmission. A zero ("0") value may indicate a non-acknowledgement, such as a failure to decode the MPDU. For example, the MPDU frame check sequence may not match the contents of the decoded MPDU. Alternatively, a missing MPDU may be detected based, at least in part, on a missing sequence number. For example, each MPDU in the AMPDU transmission may be associated with a sequence number. The STA 230 may determine that a MPDU was not properly received if there is a skip (e.g., a "hole") in the sequence numbers of the MPDUs that are decoded from the AMPDU transmission.

The AP 205 may determine whether to adjust the MCS or select another MCS for future AMPDU transmissions. Any of the solutions described above, either individually or in combination, may be implemented make such a determination, as well as to make the MCS adjustment or selection. Such implementation may be via the rate controller 220, or other suitable component(s) of the AP 205, such as a processor configured to make the various determinations of the solutions described above.

Figure 3A:
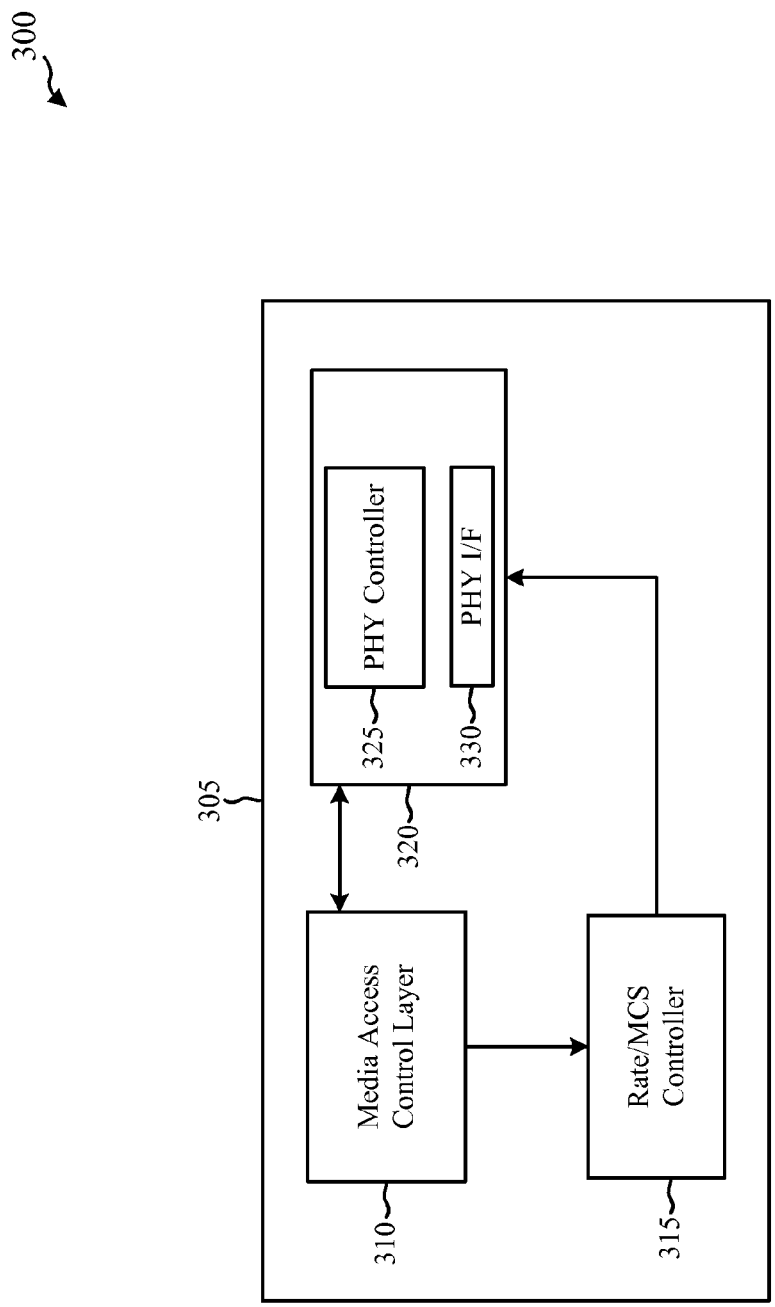
FIG. 3A shows a block diagram illustrating an example of a network device or access point (AP), in accordance with various aspects of the present disclosure.

FIG. 3A is a block diagram 300 illustrating an example AP 305 in accordance with various aspects of the present disclosure. Data (not shown) to be transmitted may be received by a MAC layer 310 of the AP 305. The MAC layer 310 may provide a data interface between components of AP 305 and a communications channel (not shown) through a PHY layer 320. Data from the MAC layer 310 may be processed by a PHY controller 325 and transmitted by a PHY interface (I/F) 330 to the communications channel. The PHY controller 325 may manage modulation, forward error correction, or other physical layer transmission properties for the PHY layer 320.

The components of the AP 305 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

A rate/MCS controller 315 may provide, based on a selected MCS, PHY settings to the PHY controller 325 in the PHY layer 320. The provided PHY settings may include an initial transmission rate setting. The PHY controller 325 may determine modulation characteristics for data to be transmitted into the communications channel based upon the PHY settings. The PHY layer 320 may transmit data from the MAC layer 310 at the data rate determined by rate/MCS controller 315 via the communications channel.

As described above, the rate/MCS controller 315 may include inputs such as error rate information (e.g., communications error parameters, or error metrics, such as BER or PER). The rate/MCS controller 315 may also include inputs such as effective aggregation data. The rate/MCS controller 315 may also receive AMPDU acknowledgement information (e.g., based on a Block ACK received by the AP 305) from the MAC layer 310. Various other information, such as described above, may be determined at the AP 305 to support the solutions described herein.

Figure 3B:
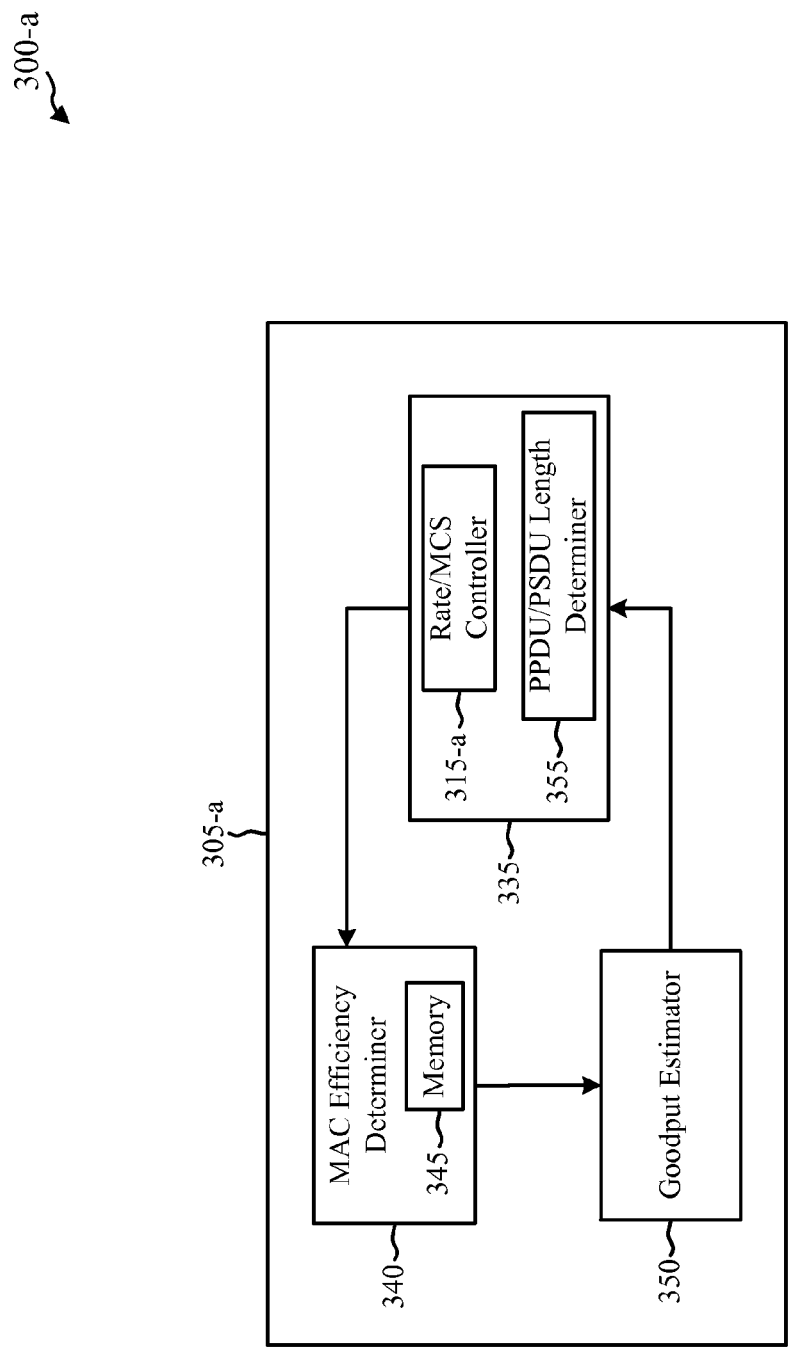
FIG. 3B shows a block diagram illustrating another example of a network device or access point (AP), in accordance with various aspects of the present disclosure.

FIG. 3B is a block diagram 300-a illustrating another example AP 305-a in accordance with various aspects of the present disclosure. Although not shown for the sake of clarity, the AP 305-a may include the components of the AP 305 described with respect to FIG. 3A.

The components of the AP 305-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

As shown in FIG. 3B, the AP 305-a may include a communications manager 335, which may control communications performed by the AP 305-a including communications transmitted to and received from STAs (e.g., STAs 115, 230). The communications manager 335 may carry out such communications using a transceiver (not shown) or a transmitter (not shown) and a separate receiver (not shown). Thus, the communications manager 335 may transmit AMPDUs (using the transceiver or transmitter) to STAs, and may receive block ACKs (using the transceiver or receiver) from STAs. Further, the communications manager 335 may support both multi-user (MU) and single-user (SU) modes for the AP 305-a.

The AP 305-a also may include a MAC efficiency determiner 340. When the AP 305-a operates in the MU mode (e.g., communicating with a plurality of STAs), the MAC efficiency determiner 340 may determine a MAC efficiency for a STA of the plurality of STAs using a real-time MU physical protocol data unit (PPDU) length, a real-time physical layer service data unit (PSDU) length of each of the plurality of stations, and an MCS of the STA. The MAC efficiency determiner 340 may take into account other factors or parameters as well, such as a current interframe spacing, a MU block ACK request frame length, and an ACK frame length.

The MCS of the STA may be provided to the MAC efficiency determiner 340 by a rate/MCS controller 315-a, which may be part of the communications manager 335 or separate, as appropriate or desired. Alternatively, the communications manager 335 may provide the MCS of the STA directly to the MAC efficiency determiner 340.

The PPDU length and the PSDU lengths also may be provided directly to the MAC efficiency determiner 340 by the communications manager 335. Alternatively, a PPDU/PSDU length determiner 355 may provide the PPDU length and the PSDU lengths to the MAC efficiency determiner 340. The PPDU/PSDU length determiner 355 may be part of the communications manager 335, as shown, part of the MAC efficiency determiner 340, or a separate component.

The AP 305-a also may include a memory 345. The memory 345 may be part of the MAC efficiency determiner 340 (e.g., dedicated) or may be a universal memory of the AP 305-a that is accessible by the MAC efficiency determiner 340. The memory 345 may store the MCS of the STA, the PPDU length and the PSDU lengths to be used by the MAC efficiency determiner 340 for determining the MAC efficiency.

Further, the memory 345 may store a set of AMPDU size constraint statistics for the MCS of the STA. The AMPDU size constraint statistics may be associated with HOL blocking. The set of AMPDU size constraint statistics may be based on a statistical PER of the MCS, a maximum AMPDU size of the MCS for a given airtime, or a combination thereof. The PPDU/PSDU length determiner 355 may determine an average PPDU length of the STA based on the AMPDU size constraint statistics for the MCS. Alternatively or additionally, the PPDU/PSDU length determiner 355 may determine an average PPDU length of the STA based on an expected length of a MU PPDU frame. Alternatively or additionally, the PPDU/PSDU length determiner 355 may determine an average PPDU length of the STA based on a distribution of the AMPDU size constraint statistics for the MCS.

The AP 305-*a* further may include a goodput estimator 350. The goodput estimator 350 may adjust a goodput estimate of the station using the MAC efficiency determined by the MAC efficiency determiner 340. The goodput estimator 350 may provide the adjusted goodput estimate to the rate/MCS controller 315-*a*, which may use the adjusted goodput estimate to adjust the MCS of the station. As discussed herein, the adjusted goodput estimate may have improved accuracy. Thus, the AP 305-*a* may manage the MCS used for communications more efficiently, and may increase throughput.

The goodput estimator 350 also may obtain a PER for the MCS of the STA, for example, from the communications manager 335, either directly or via the MAC efficiency determiner 340 (e.g., along with the MAC efficiency). The goodput estimator 350 may determine a second goodput estimate from a first goodput estimate, the PER for the MCS of the STA, and the determined MAC efficiency.

Figure 3C:
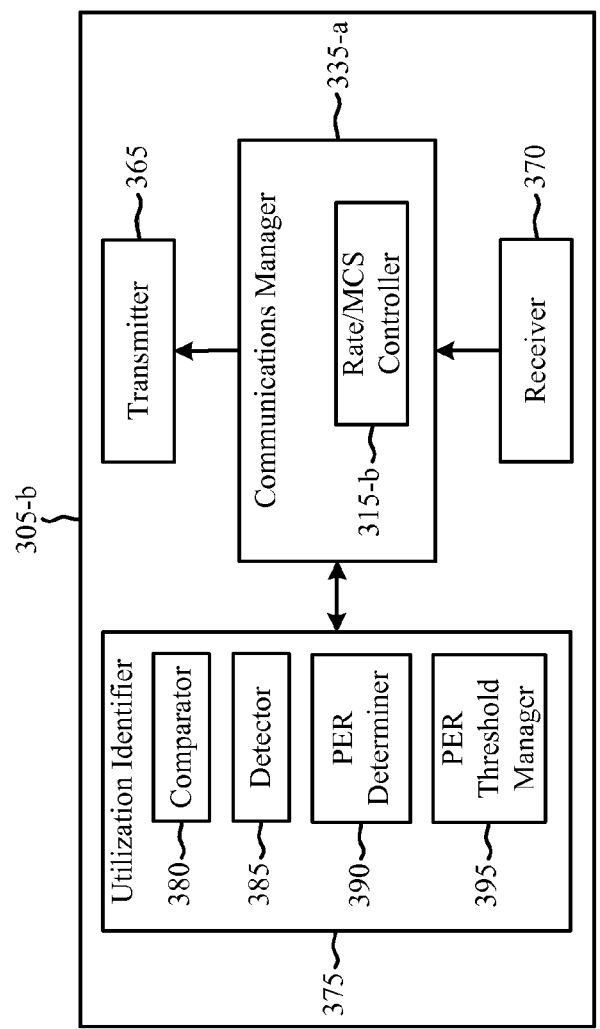
FIG. 3C shows a block diagram illustrating yet another example of a network device or access point (AP), in accordance with various aspects of the present disclosure.

FIG. 3C is a block diagram 300-*b* illustrating another example AP 305-*b* in accordance with various aspects of the present disclosure. Although not shown for the sake of clarity, the AP 305-*b* may include the components of the AP 305 described with respect to FIG. 3A.

The components of the AP 305-*b* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

As shown in FIG. 3C, the AP 305-*b* may include a communications manager 335-*a*, which may control communications performed by the AP 305-*a* including communications transmitted to and received from STAs (e.g., STAs 115, 230) and may support both MU and SU modes for the AP 305-*a*, such as described above with respect to the communications manager 335 in FIG. 3B. For example, the AP 305-*b* may include a transmitter to communicate with a STA using a first MCS (e.g., by transmitting AMPDUs), and a receiver 370 to receive a block ACK in response to an AMPDU transmission using the first MCS.

The AP 305-*b* also may include a utilization identifier 375. The utilization identifier 375 may identify an under-utilization of an MPDU aggregation of the station while using the first MCS, such as described herein. The under-utilization may be caused by PER-induced HOL blocking. The utilization identifier 375 may include various components to carry out such identification. For example, the utilization identifier 375 may include a comparator 380, a detector 385, a PER determiner 390, and a PER threshold manager.

The comparator 380 may compare an AMPDU size implemented by the STA with a threshold size associated with the first MCS. The detector 385 may detect an AMPDU size of a wireless transmission in real time. Alternatively or additionally, the detector 385 may detect a PPDU size of a wireless transmission.

The PER determiner 390 may determine a PER from the block ACK received by the receiver 370 in response to an AMPDU transmission using the first MCS. The comparator 380 also may compare the determined PER to a threshold PER. The PER threshold manager 395 may set the PER threshold based on the first MCS. Alternatively, the PER threshold manager 395 may set the PER threshold based on whether the AMPDU transmission is forwarded by the AP 305-*b* using the MU mode or the SU mode.

The AP 305-*b* further may include a rate/MCS controller 315-*b*, which may be part of the communications manager 335-*a* or separate. The rate/MCS controller 315-*b* may switch to a second MCS that is lower than the first MCS (e.g., when the utilization identifier 375 has identified an under-utilization of the MPDU aggregation of the station while using the first MCS). For example, the rate/MCS controller 315-*b* may switch to the second MCS when the PER determined by the PER determiner 390 satisfies the PER threshold.

It should be noted that while the APs 305-*a* and 305-*b* are described separately with respect to FIGS. 3B and 3C, respectively, the various components and features thereof may be combined such that other implementations are possible.

Figure 4:
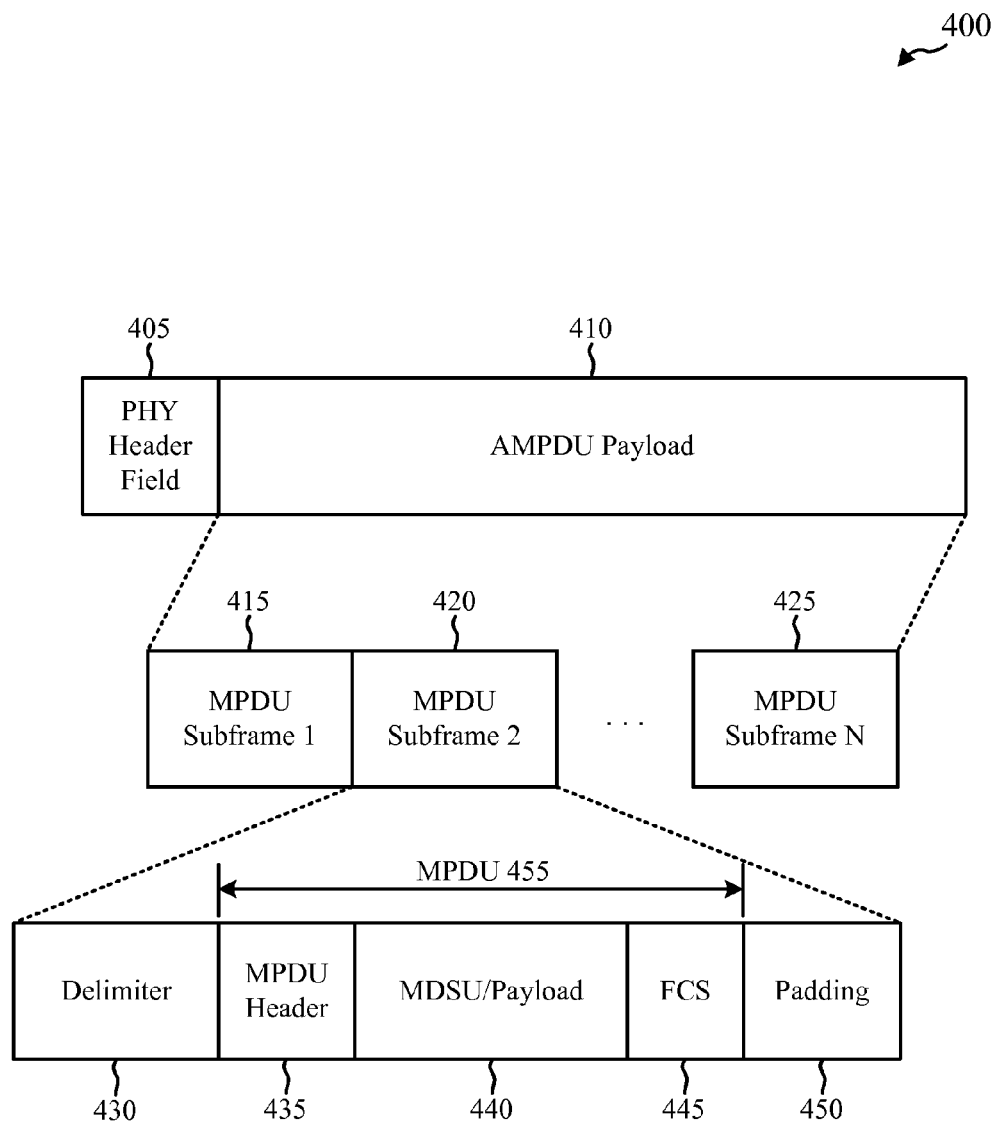
FIG. 4 shows a diagram illustrating an AMPDU frame format, in accordance with various aspects of the present disclosure.

FIG. 4 is a diagram illustrating an example AMPDU frame 400 format that may be used for the AMPDUs transmitted by the APs or network devices described herein. The AMPDU frame 400 format may include a PHY header 405 portion and an AMPDU payload 410 portion. The AMPDU payload 410 may include a plurality of MPDUs, which may be structured as MPDU subframes, such as an MPDU subframe "1" 415, an MPDU subframe "2" 420, and an MPDU subframe "N" 425, within the AMPDU payload 410. The number N of MPDUs within the AMPDU payload 410 may determine the AMPDU size. As shown, the MPDU subframe 420 may include a delimiter field 430, an MPDU header 435, payload 440 (e.g., MAC service data unit (MSDU)), a frame check sequence (FCS) field 445, and padding 450. The MPDU header 435, the payload 440, and the FCS field 445 may collectively form an MPDU 455. Each MPDU subframe may have a structure similar as illustrated for MPDU subframe 420. It should be understood that the quantity of MPDU subframes included in the AMPDU payload 410 may be variable. In accordance with some WLAN implementations, the quantity of MPDU subframes may be limited to a maximum of 64 units. Furthermore, the quantity of MPDU subframes may be selectable from fixed predetermined quantities (e.g., 1, 2, 4, 8, 16, 32, or 64).

Figure 5:
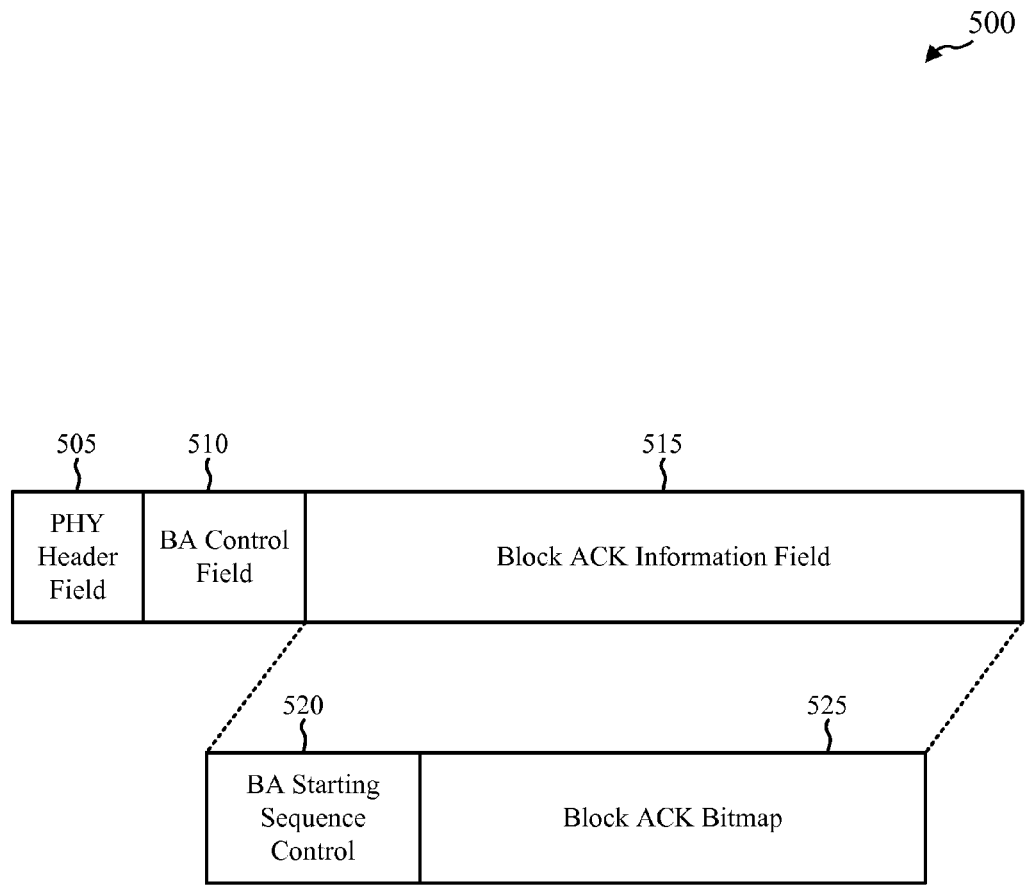
FIG. 5 shows a diagram illustration a Block ACK frame format in accordance with various aspects of the present disclosure.

FIG. 5 is a diagram illustration an example Block ACK (BA) frame 500 format that may be used for the block ACK transmitted by the STAs described herein. The BA frame 500 may include a PHY (frame) header field 505, a BA control field 510 and a Block ACK information field 515. The BA control field 510 may provide information regarding the size or structure of the BA information field 515. The BA information field 515 may include a BA starting sequence control field 520 and a Block ACK bitmap 525. The BA starting sequence control field 520 may include a value to indicate a first or starting sequence number of the MPDUs being acknowledged by the BA frame 500. The Block ACK bitmap 525 may include one or more bits for each MPDU acknowledged (or non-acknowledged) in the BA frame 500.

Figure 6:
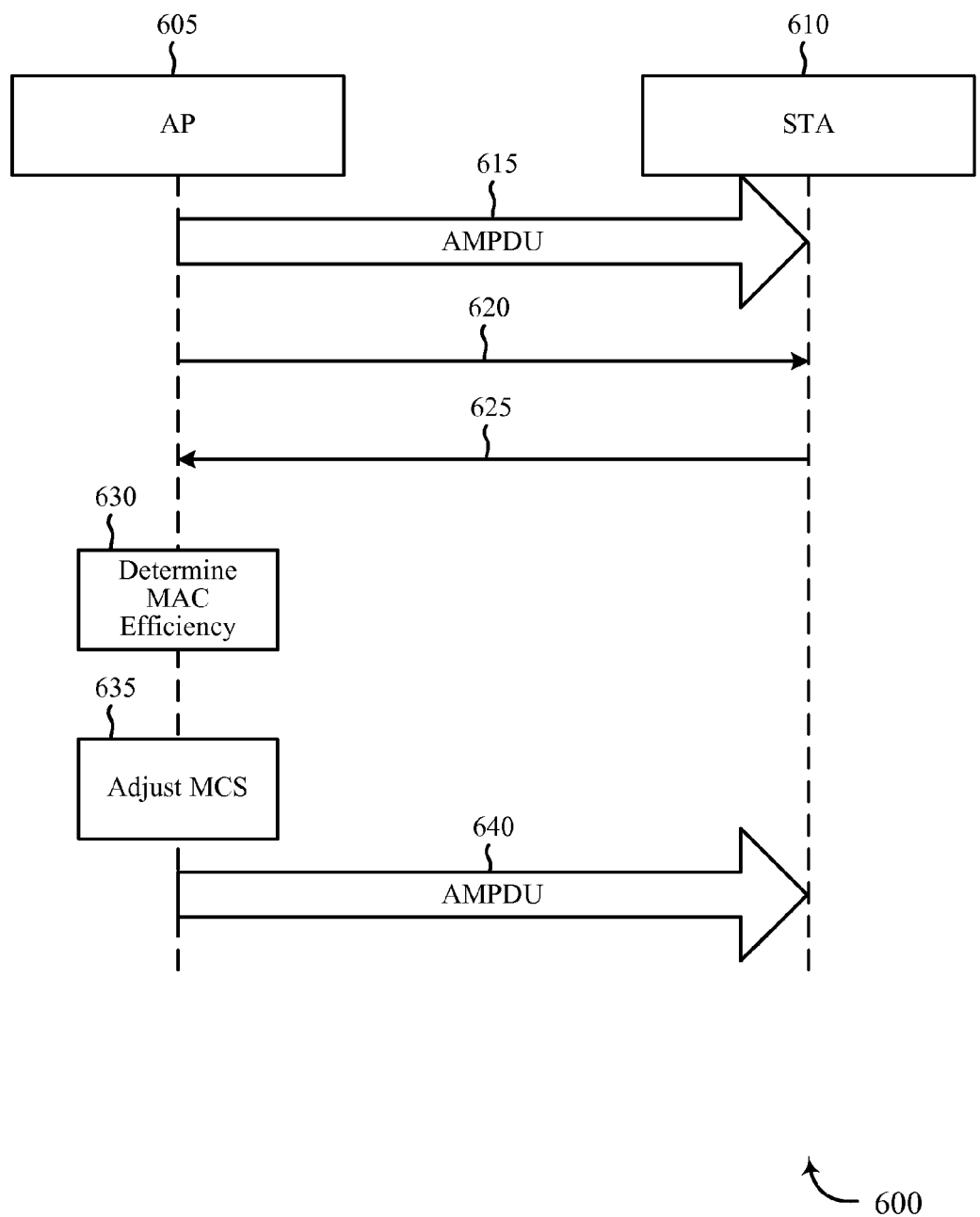
FIG. 6 shows a swim diagram illustrating various messages between an access point (AP) and a wireless device or station (STA) and operations that may be performed by the AP, in accordance with various aspects of the present disclosure.

FIG. 6 is swim diagram 600 illustrating various messages and operations in accordance with various aspects of the disclosure. In the swim diagram 600, an access point (AP) 605 and a STA 610 are shown. The AP 605 and the STA 610 may be examples of the AP 105 and the STAs 115, respectively, described with respect to FIG. 1. As such, the AP 605 and the STA 610 may be coupled via a communications channel that supports frame aggregation.

The AP 605 may transmit an AMPDU frame in a message 615 to the STA 610. The AMPDU frame may include a plurality of MPDUs. For example, the AMPDU frame may be formatted similar to the example AMPDU frame 400 described with respect to FIG. 4. The AP 605 also may send a BA Request (BAR) frame in a message 620 to the STA 610 to request acknowledgement of the MPDUs included in the AMPDU frame. A block acknowledgement starting sequence control value may be included in the BAR frame to signal a first MPDU in the block for which an acknowledgment is requested. MPDUs in a buffer (not shown) of the STA 610 with a sequence control value that precedes the starting sequence control value may be called preceding MPDUs. The STA 610 may reassemble any complete MSDUs from buffered preceding MPDUs and indicate these to a higher layer. The STA 610 may maintain a block acknowledgement record consisting of originator address, TID, and a record of reordering buffer size indexed by the received MPDU sequence control value. This record may hold the acknowledgment state of the data frames received from the AP 605.

The STA 610 may respond to the message 620 with a BA frame in a message 625. For example, the BA frame may be formatted similar to the example BA frame 500 described with respect to FIG. 5. The BA frame may include acknowledgments (or non-acknowledgements) for the MPDUs (e.g., up to 64 previous MSDUs). In the BA frame, the STA 610 may acknowledge the MPDUs starting from the starting sequence control until the MPDU with the highest sequence number that has been received, and may set bits in the Block ACK bitmap 525 corresponding to all other MPDUs (not received) to zero.

After receiving the BA frame in message 625, the AP 605 may perform an operation 630 to determine a MAC efficiency using information from the BA frame and other information, such as described above. Then, the AP 605 may perform an operation 635 to adjust the MCS using the determined MAC efficiency. The AP 605 may use the adjusted MCS to transmit a subsequent AMPDU frame in a message 640 to the STA 610.

Although the operations 630 and 635 are described in terms of one of the solutions described herein, it should be understood that such operations may be added to or changed as appropriate to implement aspects of the other solutions described herein. For example, the operation 630 may be replaced by or include directly detecting inefficient aggregation and the operation 635 may involve switching to another (e.g., lower) MCS. Alternatively or additionally, the operation 630 may involve determining a PER indicated by the BA frame and the operation 635 may involve selecting another (e.g., lower) MCS when the PER exceeds a threshold.

With the AP 605 operating in the MU mode, the operation 630 may involve determining the AMPDU sizes of the respective STAs (e.g., STA 610, etc.) and the operation 635 may involve determining an AMPDU size (which may correspond to an MCS) for MU transmissions using the determined AMPDU sizes. Other operations, such as removing a wireless device(s) from MU transmissions, also may be performed at the AP 605.

It should be understood that in some aspects of the disclosed approaches, the AP 605 may communicate any change in the MCS to the STA 610 prior to transmission of the subsequent AMPDU frame in the message 640 using the new MCS. For example, the PHY header of a subsequent frame may indicate the new MCS. Alternatively, a separate message (not shown) may be transmitted to indicate the change in MCS to the STA 610.

Figure 7:
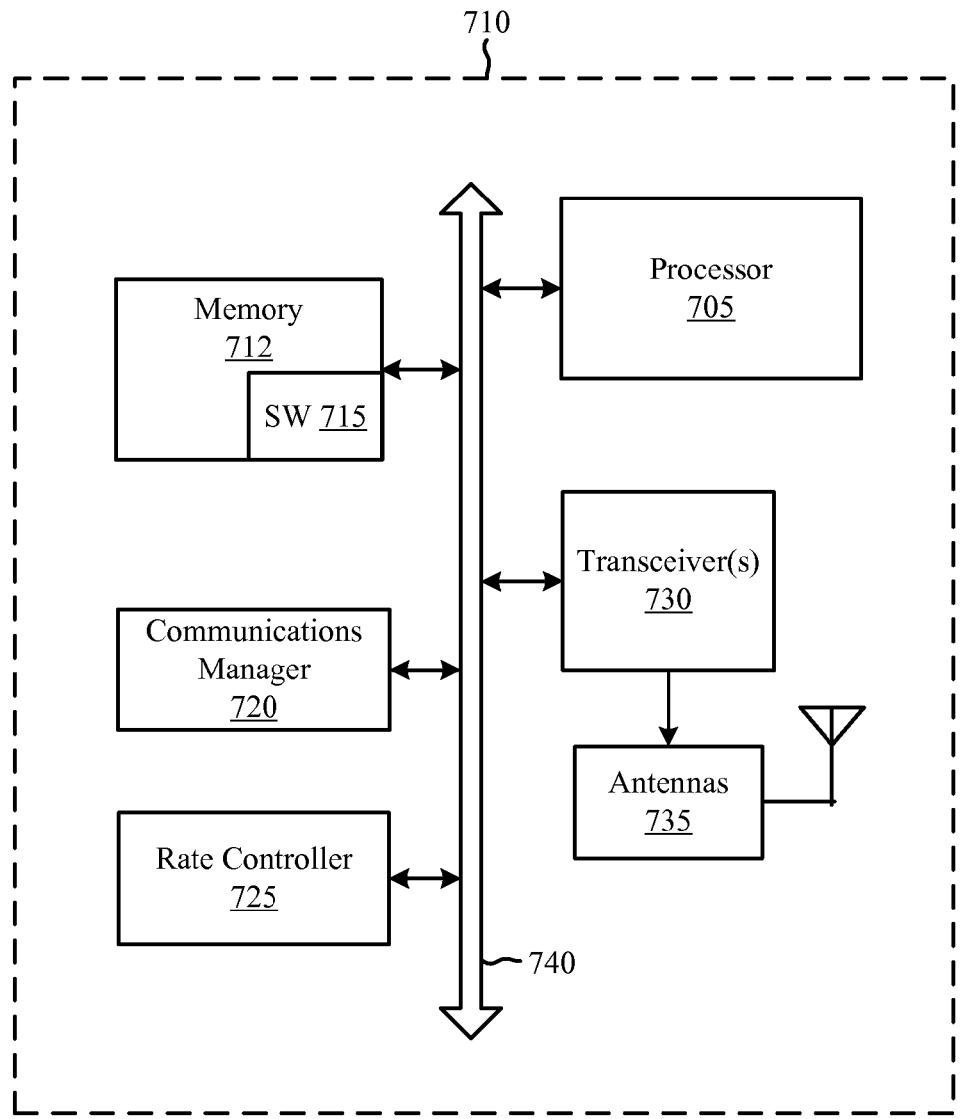
FIG. 7 shows a block diagram of an architecture of a wireless device or station (STA), in accordance with various aspects of the present disclosure.

FIG. 7 shows a block diagram 700 of a STA 710. The STA 710 may be an example of the STAs 115, 230, 610 described with reference to FIGS. 1, 2 and 6. The STA 710 may include a processor 705, a memory 712, a communications manager 720, a rate controller 725, a transceiver(s) 730, and an antenna(s) 735. The communications manager 720 may be an example of the Block ACK controller 235 of FIG. 2, and may be configured to manage various aspects or communications performed by the STA 710 in addition to providing Block ACK frames, either automatically upon receipt of AMPDUs at the STA 710 or in response to receipt of a Block ACK request at the STA 710. Each of these components may be in communication with each other, directly or indirectly, over at least one bus 740.

The components of the STA 710 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

The memory 712 may include random access memory (RAM) and read-only memory (ROM). The memory 712 may store computer-readable, computer-executable software (SW) code 715 containing instructions that are configured to, when executed, cause the processor 705 to perform various functions described herein for wireless communications. Alternatively, the software code 715 may not be directly executable by the processor 705 but may be configured to cause a computer (e.g., when compiled and executed) to perform functions described herein.

The processor 705 may include an intelligent hardware device, e.g., a CPU, a microcontroller, an ASIC, etc. The processor 705 may process information received through the transceiver(s) 730 or to be sent to the transceiver(s) 730 for transmission through the antenna(s) 735. The processor 705 may handle, alone or in connection with the communications manager 720, various aspects for wireless communication.

The transceiver(s) 730 may be configured to communicate bi-directionally with the APs 105, 205, 305, 605 in FIGS. 1, 2, 3 and 6. The transceiver(s) 730 may be implemented as at least one transmitter module and at least one separate receiver module. The transceiver(s) 730 may receive information such as packets, user data, or control information associated with various information channels (e.g., control channels, data channels, etc.). For example, the transceiver(s) 730 may be configured to receive AMPDUs from a network device, such as an AP. Information may be passed on to other components of the STA 710, such as the processor 705, the memory 712 and the communications manager 720. The transceiver(s) 730 also may transmit signals received from other components of the STA 710. The transceiver(s) 730 may transmit Block ACK or BA frames to the network device (e.g., AP).

The transceiver(s) 730 may include a modem configured to modulate the packets and provide the modulated packets to the antenna(s) 735 for transmission, and to demodulate packets received from the antenna(s) 735. While the STA 710 may include a single antenna, there may be aspects in which the STA 710 may include multiple antennas 735.

According to the architecture of FIG. 7, the STA 710 may include the rate controller 725 to implement an MCS in accordance with the MCS adjusted, selected or otherwise determined by the rate controller 220 or 315 in FIG. 2 or 3 of the AP 205, 305. Alternatively, functionality of the rate controller 725 may be implemented as a component of the communications manager 720 or the transceiver(s) 730, as a computer program product, or as at least one controller element of the processor 705.

The components of the STA 710 may be configured to implement aspects discussed above with respect to FIG. 1, 2 or 6, and those aspects may not be repeated here for the sake of brevity.

Figure 8:
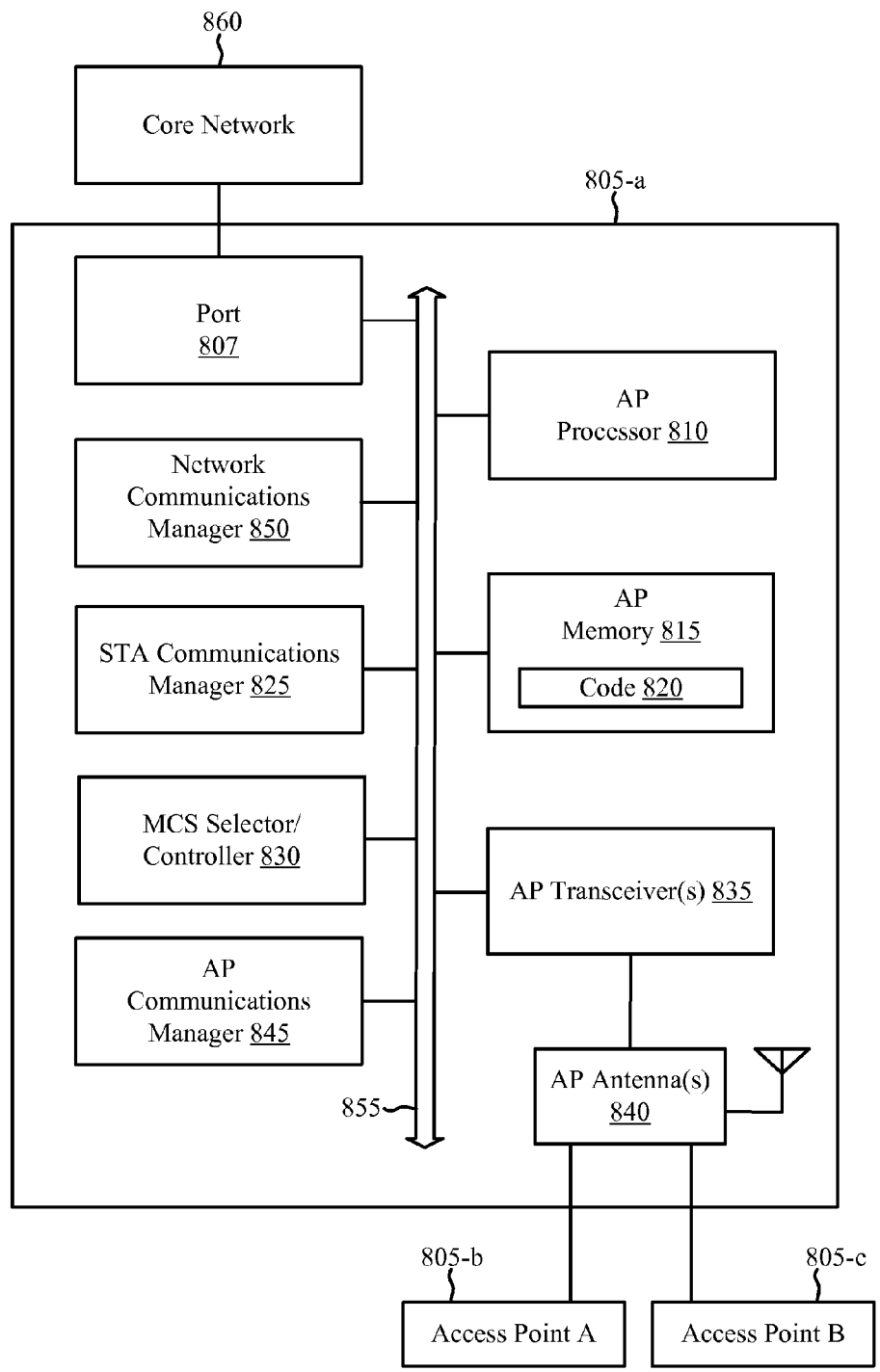
FIG. 8 shows a block diagram of an architecture of an access point (AP), in accordance with various aspects of the present disclosure.

FIG. 8 shows diagram 800 of an AP 805-a. The AP 805-a may be an example of the APs 105, 205, 305, 605 described with reference to FIGS. 1, 2, 3 and 6. The AP 805-a may include a processor 810, a memory 815, a STA communications manager 825 for communicating with STAs, an MCS selector/controller 830, an AP transceiver(s) 835, and an AP antenna(s) 840. The MCS selector/controller 830 may be an example of the rate controllers 220, 315 of FIG. 2 or 3. The AP 805-a may also include one or both of an AP communications manager 845 and a network communications manager 850 for communicating with APs 805-b, 805-c (e.g., via antennas 840 and AP transceiver(s) 835) and a core network 860 (e.g., via a wired port 807), respectively. Each of the components of the AP 805-a may be in communication with each other, directly or indirectly, over at least one bus 855.

The components of the AP 805-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors. For example, all or portions of one or more of the managers/controllers 825, 830, 845, 850 may be embodied in instructions stored in memory 815.

The memory 815 may include RAM and ROM. The memory 815 may also store computer-readable, computer-executable software (SW) code 820 containing instructions that are configured to, when executed, cause the processor 810 to perform various functions described herein for wireless communications. Alternatively, the software code 820 may not be directly executable by the processor 810 but be configured to cause a computer, (e.g., when compiled and executed) to perform functions described herein.

The processor 810 may include an intelligent hardware device, e.g., a central processing unit (CPU), a microcontroller, an ASIC, etc. The processor 810 may process information received through the AP transceiver(s) 835, the AP communications manager 845, or the network communications manager 850. The processor 810 may also process information to be sent to the AP transceiver(s) 835 for transmission through the antenna(s) 840, to the AP communications manager 845, or to the network communications manager 850. The processor 810 may handle, alone or in connection with the STA communications manager 825 or the MCS selector/controller 830, various aspects related to wireless communications with the STAs 115, 230, 610.

The AP transceiver(s) 835 may be configured to communicate bi-directionally with the STAs 115, 230, 610 in FIGS. 1, 2 and 6. The AP transceiver(s) 835 may be implemented as at least one transmitter module and at least one separate receiver module. The AP transceiver(s) 835 may receive information such as packets, user data, or control information associated with various information channels (e.g., control channels, data channels, etc.). For example, the AP transceiver(s) 835 may be configured to receive MPDUs from a STA. Information may be passed on to other components of the AP 805-a, such as the processor 810, the memory 815 and the STA communications manager 825. The AP transceiver(s) 835 also may transmit signals (e.g., AMPDUs, MCS information, etc.) received from other components of the AP 805-a.

The AP transceiver(s) 835 may include a modem configured to modulate the packets and provide the modulated packets to the antenna(s) 840 for transmission, and to demodulate packets received from the antenna(s) 840. While the AP 805-a may include a single antenna, there may be aspects in which the AP 805 may include multiple antennas 840.

According to the architecture of FIG. 8, the AP 805-a may include the MCS selector/controller 830 to select, adjust or otherwise manage the MCS employed by the AP 805-a. Alternatively, functionality of the MCS selector/controller 830 may be implemented as a component of the STA communications manager 825 or the transceiver(s) 835, as a computer program product, or as at least one controller element of the processor 810.

The components of the AP 805-a may be configured to implement aspects discussed above with respect FIG. 1, 2 or 6, and those aspects may not be repeated here for the sake of brevity. Moreover, the components of the AP 805-a may be configured to implement aspects discussed below with respect to FIG. 9, 10, 11, 12 or 13, and those aspects may not be repeated here also for the sake of brevity.

Figure 9:
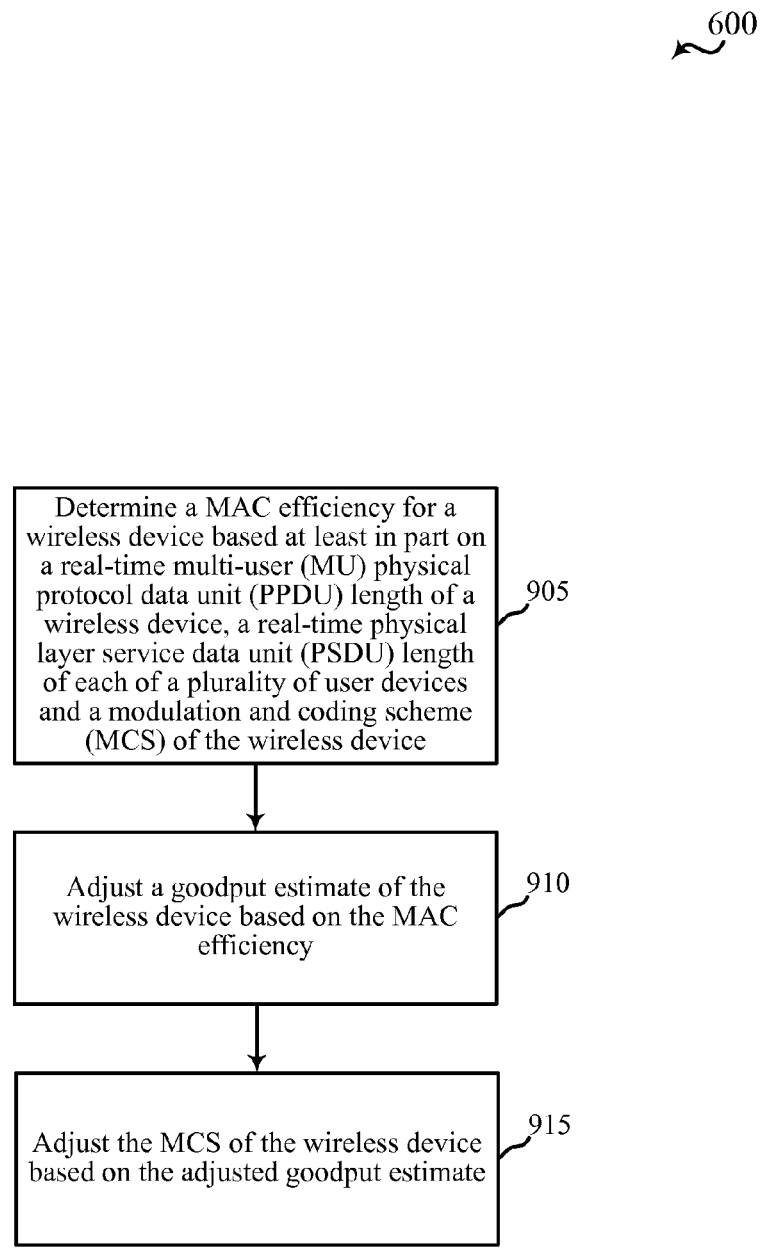
FIG. 9 is a flowchart illustrating an example of a method for wireless communications, in accordance with various aspects of the present disclosure.

FIG. 9 is a flowchart illustrating an example of a method 900 for wireless communication, in accordance with various aspects of the present disclosure. For clarity, the method 900 is described below with reference to aspects of the APs 105, 205, 305, 605, 805 described with reference to FIGS. 1, 2, 3, 6 and 8. The AP may execute set(s) of codes to control the functional elements of the AP or network device to perform the functions described below. Additionally or alternatively, the AP may perform one or more of the functions described below using-purpose hardware.

At block 905, the method may involve determining a MAC efficiency for a wireless device based at least in part on a real-time multi-user (MU) physical protocol data unit (PPDU) length of a wireless device, a real-time physical service data unit (PSDU) length of each of a plurality of user devices and a modulation and coding scheme (MCS) of the wireless device. Such determination may use information from a Block ACK as well as other information, such as described above.

The operation(s) at block 905 may be performed using the rate controller 220, 315 described with reference to FIG. 2 or 3, or the MCS selector/controller 830, the STA communications manager 825 or the processor 810 described with reference to FIG. 8.

At block 910, a goodput estimate of the wireless device may be adjusted using the MAC efficiency, for example, by multiplying an existing goodput estimate (determined using the current approach) by the determined MAC efficiency. The operation(s) at block 910 also may be performed using the rate controller 220, 315 described with reference to FIG. 2 or 3, or the MCS selector/controller 830, the STA communications manager 825 or the processor 810 described with reference to FIG. 8.

At block 915, the MCS of the wireless device may be adjusted (e.g., selected) based on the adjusted goodput estimate. The operation(s) at block 910 also may be performed using the rate controller 220, 315 described with reference to FIG. 2 or 3, the MCS selector/controller 830 and the transceiver(s) 835 described with reference to FIG. 8.

Thus, the method 900 may provide for wireless communication in which the MCS may be adjusted or otherwise adapted more efficiently, for example, to increase throughput. It should be noted that the method 900 is just one implementation and that the operations of the method 900 may be rearranged or otherwise modified such that other implementations are possible.

Figure 10:
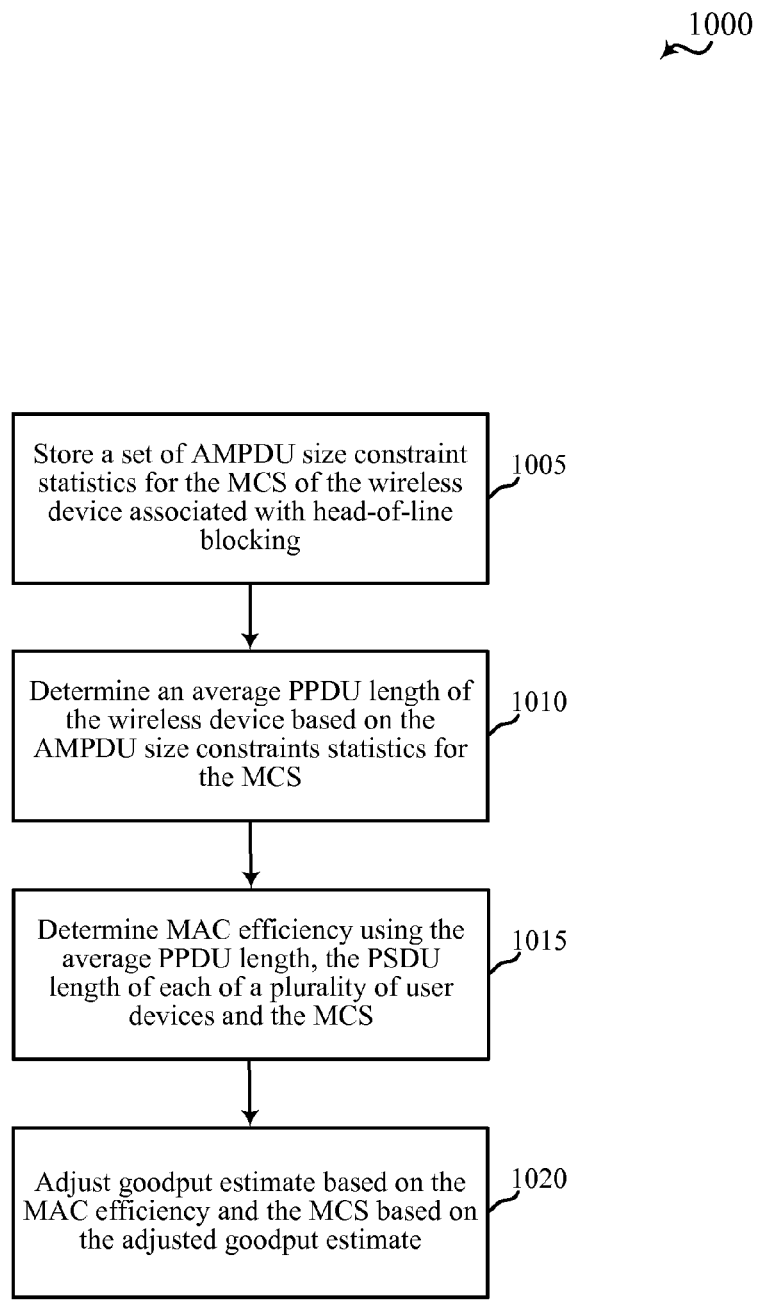
FIG. 10 is a flowchart illustrating another example of a method for wireless communications, in accordance with various aspects of the present disclosure.

FIG. 10 is a flowchart illustrating an example of a method 1000 for wireless communication, in accordance with various aspects of the present disclosure. For clarity, the method 1000 is described below with reference to aspects of the APs 105, 205, 305, 605, 805 described with reference to FIGS. 1, 2, 3, 6 and 8. The AP may execute set(s) of codes to control the functional elements of the AP to perform the functions described below. Additionally or alternatively, the AP may perform one or more of the functions described below using-purpose hardware.

At block 1005, the method may involve storing a set of AMPDU size constraint statistics for the MCS of the wireless device associated with head-of-line blocking. Such statistics may be determined offline, but may be determined online for improved accuracy. The AMPDU size constraint statistics may be correlated with respective MCSs, for example, by the processor 810 and stored in the memory 815 described with reference to FIG. 8.

At block 1010, an average PPDU length of the wireless device may be determined based on the AMPDU size constraints statistics for the MCS. For example, the processor 810 may access the statistics from memory 815 corresponding to the MCS currently being used by the AP, and may calculate or otherwise determine the average PPDU length therefrom.

At block 1015, a MAC efficiency may be determined using the average PPDU length, the PSDU length of each of a plurality of user devices and the current MCS. Such determination may use information from a Block ACK as well as other information, such as described above. The operation(s) at block 1015 may be performed using the rate controller 220, 315 described with reference to FIG. 2 or 3, the MCS selector/controller 830, the STA communications manager 825 and the processor 810 described with reference to FIG. 8.

At block 1020, a goodput estimate of the wireless device may be adjusted using the MAC efficiency and the MCS of the wireless device may be adjusted (e.g., selected) based on the adjusted goodput estimate, such as described above. Thus, the method 1000 also may provide for wireless communication in which the MCS may be adjusted or otherwise adapted more efficiently, for example, to increase throughput. It should be noted that the method 1000 is just one implementation and that the operations of the method 1000 may be rearranged or otherwise modified such that other implementations are possible.

Figure 11:
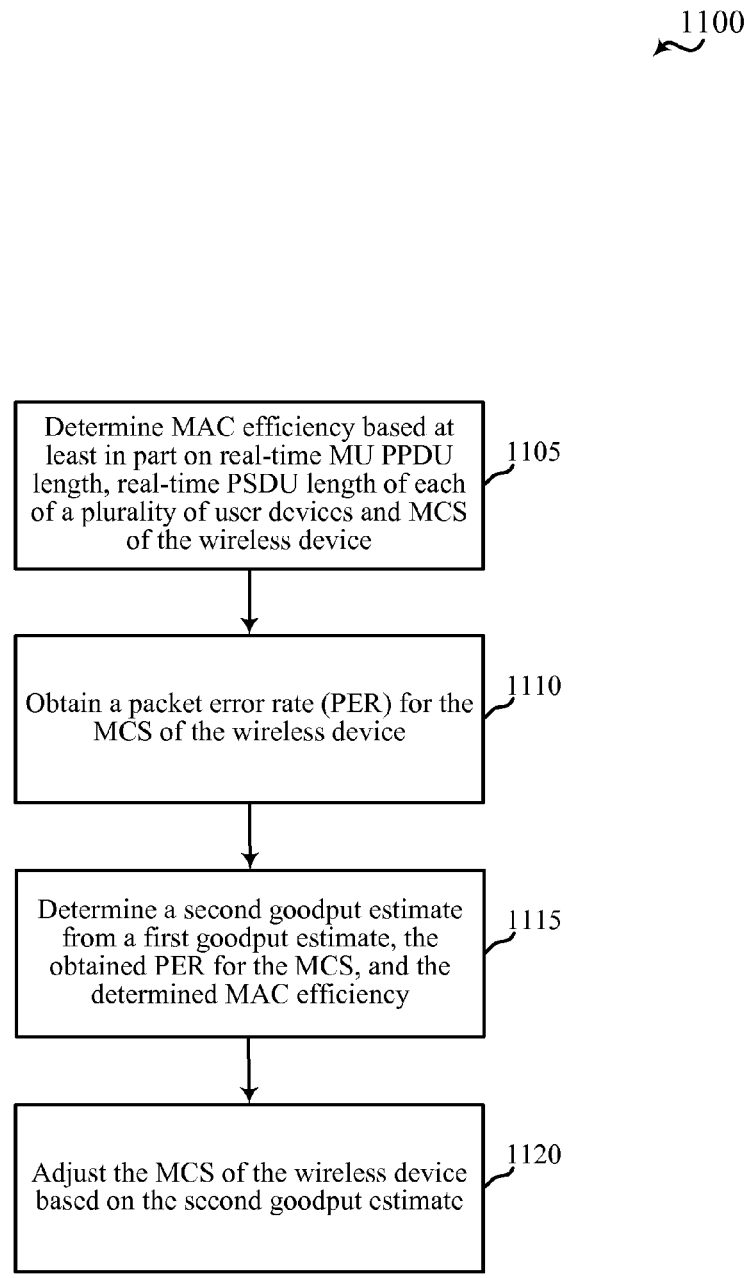
FIG. 11 is a flowchart illustrating yet another example of a method for wireless communications, in accordance with various aspects of the present disclosure.

FIG. 11 is a flowchart illustrating an example of a method 1100 for wireless communication, in accordance with various aspects of the present disclosure. For clarity, the method 1100 is described below with reference to aspects of the APs 105, 205, 305, 605, 805 described with reference to FIGS. 1, 2, 3, 6 and 8. The AP may execute set(s) of codes to control the functional elements of the AP to perform the functions described below. Additionally or alternatively, the AP may perform one or more of the functions described below using-purpose hardware.

At block 1105, the method may involve determining a MAC efficiency for a wireless device based at least in part on a real-time MU PPDU length of a wireless device, a real-time (PSDU) length of each of a plurality of user devices and an MCS of the wireless device, such as described with reference to FIG. 9 (block 905).

At block 1110, a packet error rate (PER) may be obtained for the MCS currently being used by the wireless device. The PER may be indicated, signaled or otherwise provided by a Block ACK from the wireless device. The operation(s) at block 1115 may be performed using the rate controller 220, 315 described with reference to FIG. 2 or 3, the MCS selector/controller 830, the STA communications manager 825 and the processor 810 described with reference to FIG. 8.

At block 1115, a second goodput estimate of the wireless device may be determined from a first goodput estimate, the obtained PER for the MCS, and the determined MAC efficiency. The operation(s) at block 1115 also may be performed using the rate controller 220, 315 described with reference to FIG. 2 or 3, the MCS selector/controller 830, the STA communications manager 825 and the processor 810 described with reference to FIG. 8.

At block 1120, the MCS of the wireless device may be adjusted (e.g., selected) based on the second goodput estimate, such as described above with respect to FIG. 9 (block 915). Thus, the method 1100 also may provide for wireless communication in which the MCS may be adjusted or otherwise adapted more efficiently, for example, to increase throughput. It should be noted that the method 1100 is just one implementation and that the operations of the method 1100 may be rearranged or otherwise modified such that other implementations are possible.

Figure 12:
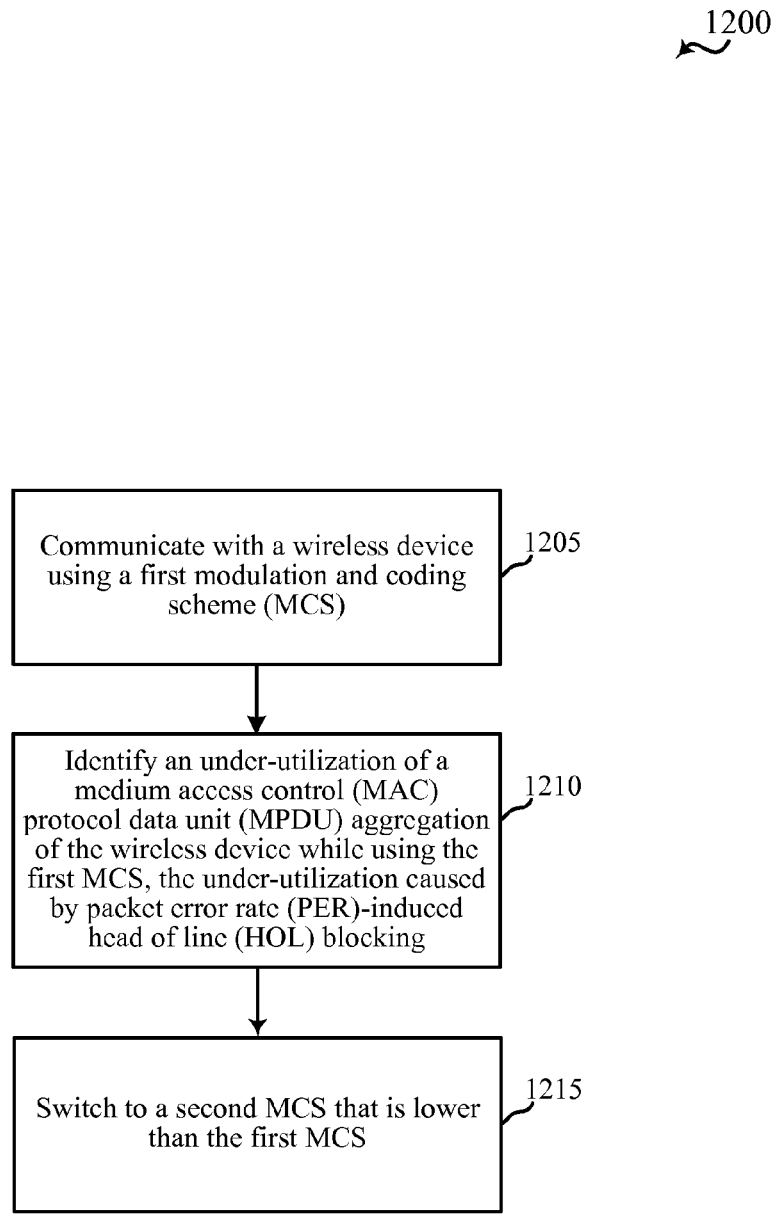
FIG. 12 is a flowchart illustrating still another example of a method for wireless communications, in accordance with various aspects of the present disclosure.

FIG. 12 is a flowchart illustrating an example of a method 1200 for wireless communication, in accordance with various aspects of the present disclosure. For clarity, the method 1200 is described below with reference to aspects of the APs 105, 205, 305, 605, 805 described with reference to FIGS. 1, 2, 3, 6 and 8. The AP or network device may execute set(s) of codes to control the functional elements of the AP or network device to perform the functions described below. Additionally or alternatively, the AP or network device may perform one or more of the functions described below using-purpose hardware.

At block 1205, an under-utilization of an MPDU aggregation of a wireless device, caused by PER-induced HOL blocking while using a first MCS, may be identified. The first MCS may be an initial MCS, which may be determined based on the capabilities of the wireless device(s) or the AP. The under-utilization may be determined as described above, such as described with respect to FIG. 2 or 6. For example, identifying such under-utilization may involve: comparing an aggregated MPDU (AMPDU) size implemented by the wireless device with a threshold AMPDU size associated with the first MCS; detecting an aggregated MPDU (AMPDU) size of a wireless transmission in real time; and/or, detecting a physical protocol data unit (PPDU) size of a wireless transmission in real time.

At block 1210, the method may involve switching to a second MCS that is lower than the first MCS. The operation(s) at block 1210 also may be performed using the rate controller 220, 315 described with reference to FIG. 2 or 3, the MCS selector/controller 830, the STA communications manager 825, the transceiver(s) 835, and the processor 810 described with reference to FIG. 8.

Thus, the method 1200 may provide for wireless communication in which the MCS may be lowered when an under-utilization of an MPDU aggregation (caused by PER-induced HOL blocking) is identified. It should be noted that the method 1200 is just one implementation and that the operations of the method 1200 may be rearranged or otherwise modified such that other implementations are possible.

Figure 13:
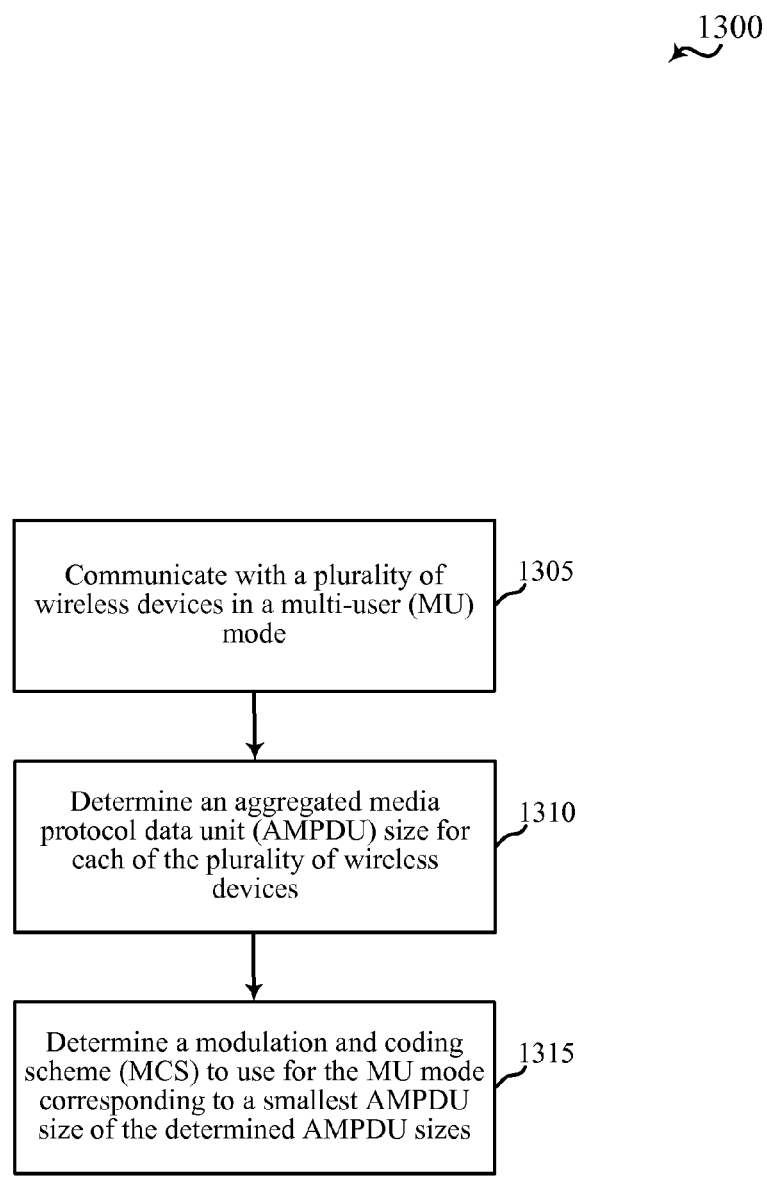
FIG. 13 is a flowchart illustrating a further example of a method for wireless communications, in accordance with various aspects of the present disclosure.

FIG. 13 is a flowchart illustrating an example of a method 1300 for wireless communication, in accordance with various aspects of the present disclosure. For clarity, the method 1300 is described below with reference to aspects of the APs 105, 205, 305, 605, 805 described with reference to FIGS. 1, 2, 3, 6 and 8. The AP or network device may execute set(s) of codes to control the functional elements of the AP or network device to perform the functions described below. Additionally or alternatively, the AP or network device may perform one or more of the functions described below using-purpose hardware.

At block 1305, the method 1300 may involve communicating with a plurality of wireless devices in a multi-user (MU) mode. As described herein, this may involve sending an AMPDU(s) formed using an MPDU(s) from each of the plurality of wireless devices. Such communicating may be performed, for example, using the various components described with respect to FIG. 2 or 3, the STA communications manager 825, the processor 810, the AP transceiver(s) 835 and the antenna(s) 840 described with respect to FIG. 8.

At block 1310, an AMPDU size may be determined for each of the plurality of wireless devices, for example, based on a communication in accordance with block 1305. The AMPDU sizes may be determined, for example, from information received in response to the communication (e.g., information provided by a Block ACK(s)). Such determination may be performed, for example, by the rate controller 220, 315 described with respect to FIG. 2 or 3, by the STA communications manager 825, and the processor 810 described with respect to FIG. 8.

At block 1315, an MCS to use for the MU mode may be determined as the MCS corresponding to a smallest AMPDU size of the determined AMPDU sizes. This operation may be performed, for example, by the rate controller 220, 315 described with respect to FIG. 2 or 3, by the STA communications manager 825, the MCS selector/controller 830, and the processor 810 described with respect to FIG. 8.

Thus, the method 1300 may provide for wireless communication in which an MCS for MU mode transmissions is determined based on a smallest AMPDU size of the plurality of wireless devices communicated with. It should be noted that the method 1300 is just one implementation and that the operations of the method 1300 may be rearranged or otherwise modified such that other implementations are possible. For example, other operations may be added to incorporate features related to removing a wireless device from the MU mode transmissions, such as described above.

Additionally, it should be noted that aspects from two or more of the methods 900, 1000, 1100, 1200 and 1300 may be combined to achieve other implementations as well.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein, such as the PHY controller 215, 325, the rate (MCS) controller 220, 315, 315-*a*, 315-*b*, 725, the block ACK controller 235, the communications manager 335, 335-*a*, 720, 825, 845, 850, the MAC efficiency determiner 340, the goodput estimator 350, the PPDU (PSDU) length determiner 355, the utilization identifier 375, the comparator 380, the detector 385, the PER determiner 390, the PER threshold manager 395, and the MCS selector/controller 830 may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   detecting in real-time a media access control (MAC) efficiency for a station of a plurality of stations based at least in part on a real-time average multi-user (MU) physical protocol data unit (PPDU) length of the station for a given airtime in comparison to an expected MU PPDU length, a real-time physical layer service data unit (PSDU) length of each of the plurality of stations, and a modulation and coding scheme (MCS) of the station; wherein the real-time average MU PPDU length is derived from a set of MU PPDUs received at a user equipment (UE) within the given airtime, and wherein determining the MAC efficiency of the station further is based at least in part on a parameter from the group consisting of: a current interframe spacing, a multi-user block acknowledgement (ACK) request frame length and an ACK frame length;
   adjusting a goodput estimate of the station in real-time using the MAC efficiency; and
   adjusting the MCS of the station using the adjusted goodput estimate.

2. The method of claim 1, further comprising:
   storing a set of aggregated MAC protocol data unit (AMPDU) size constraint statistics for the MCS of the station associated with head-of-line blocking.

3. The method of claim 2, wherein the set of AMPDU size constraint statistics are based at least in part on a parameter from the group consisting of:
   a statistical packet error rate of the MCS and a maximum AMPDU size of the MCS for a given airtime.

4. The method of claim 2, further comprising:
   determining the average physical protocol data unit (PPDU) length of the station based at least in part on a parameter from the group consisting of: the set of AMPDU size constraint statistics for the MCS, an expected length of a multi-user PPDU frame and a distribution of the AMPDU size constraint statistics for the MCS of the station.

5. The method of claim 1, wherein adjusting the goodput estimate of the station comprises:
   obtaining a packet error rate (PER) for the MCS of the station; and
   determining a second goodput estimate of the station from a first goodput estimate, the packet error rate for the MCS of the station, and the MAC efficiency of the station.

6. An apparatus for wireless communication, comprising:
   means for detecting in real-time a media access control (MAC) efficiency for a station of a plurality of stations based at least in part on a real-time average multi-user (MU) physical protocol data unit (PPDU) length of the station for a given airtime in comparison to an expected MU PPDU length, a real-time physical layer service data unit (PSDU) length of each of the plurality of stations, and a modulation and coding scheme (MCS) of the station; wherein the real-time average MU PPDU length is derived from a set of MU PPDUs received at a user equipment (UE) within the given airtime, and wherein determining the MAC efficiency of the station further is based at least in part on a parameter from the group consisting of: a current interframe spacing, a multi-user block acknowledgement (ACK) request frame length and an ACK frame length;
   means for adjusting a goodput estimate of the station in real-time using the MAC efficiency; and
   means for adjusting the MCS of the station using the adjusted goodput estimate.

7. The apparatus of claim 6, further comprising:
   means for storing a set of aggregated MAC protocol data unit (AMPDU) size constraint statistics for the MCS of the station associated with head-of-line blocking.

8. The apparatus of claim 7, wherein the set of AMPDU size constraint statistics are based at least in part on a parameter from the group consisting of:
   a statistical packet error rate of the MCS and a maximum AMPDU size of the MCS for a given airtime.

9. The apparatus of claim 7, further comprising:
   means for determining the average physical protocol data unit (PPDU) length of the station based at least in part on a parameter from the group consisting of: the set of AMPDU size constraint statistics for the MCS, an expected length of a multi-user PPDU frame and a distribution of the AMPDU size constraint statistics for the MCS of the station.

10. The apparatus of claim 6, wherein the means for adjusting the goodput estimate of the station comprises:
means for obtaining a packet error rate (PER) for the MCS of the station; and
means for determining a second goodput estimate of the station from a first goodput estimate, the packet error rate for the MCS of the station, and the MAC efficiency of the station.

11. An apparatus for wireless communication, comprising:
a processor; and
memory storing computer-executable code for wireless communication, the code executable by the processor to cause the apparatus to:
detect in real-time a media access control (MAC) efficiency for a station of a plurality of stations based at least in part on a real-time multi-user (MU) physical protocol data unit (PPDU) length of the station for a given airtime in comparison to an expected MU PPDU length, a real-time physical layer service data unit (PSDU) length of each of the plurality of stations, and a modulation and coding scheme (MCS) of the station; wherein the real-time average MU PPDU length is derived from a set of MU PPDUs received at a user equipment (UE) within the given airtime, and wherein determining the MAC efficiency of the station further is based at least in part on a parameter from the group consisting of: a current interframe spacing, a multi-user block acknowledgement (ACK) request frame length and an ACK frame length;
adjust a goodput estimate of the station in real-time using the MAC efficiency; and
adjust the MCS of the station using the adjusted goodput estimate.

12. The apparatus of claim 11, wherein the memory further stores:
a set of aggregated MAC protocol data unit (AMPDU) size constraint statistics for the MCS of the station associated with head-of-line blocking.

13. The apparatus of claim 12, wherein the set of AMPDU size constraint statistics are based at least in part on a parameter from the group consisting of:
a statistical packet error rate of the MCS and a maximum AMPDU size of the MCS for a given airtime.

14. The apparatus of claim 12, wherein the code is further executable by the processor to cause the apparatus to:
determine the average PPDU length of the station based at least in part on a parameter from the group consisting of: the set of AMPDU size constraint statistics for the MCS, an expected length of a multi-user PPDU frame and a distribution of the AMPDU size constraint statistics for the MCS of the station.

15. The apparatus of claim 11, wherein the code is further executable by the processor to cause the apparatus to:
obtain a packet error rate (PER) for the MCS of the station; and
determine a second goodput estimate of the station from a first goodput estimate, the packet error rate for the MCS of the station, and the MAC efficiency of the station.

16. A non-transitory computer-readable medium storing computer-executable code for wireless communication, the code executable by a processor to cause a device to:
detect in real-time a media access control (MAC) efficiency for a station of a plurality of stations based at least in part on a real-time average multi-user (MU) physical protocol data unit (PPDU) length of the station for a given airtime in comparison to an expected MU PPDU length, a real-time physical layer service data unit (PSDU) length of each of the plurality of stations, and a modulation and coding scheme (MCS) of the station; wherein the real-time average MU PPDU length is derived from a set of MU PPDUs received at a user equipment (UE) within the given airtime, and wherein determining the MAC efficiency of the station further is based at least in part on a parameter from the group consisting of: a current interframe spacing, a multi-user block acknowledgement (ACK) request frame length and an ACK frame length;
adjust a goodput estimate of the station in real-time using the MAC efficiency; and
adjust the MCS of the station using the adjusted goodput estimate.

17. The non-transitory computer-readable medium of claim 16, wherein the code is further executable by the processor to cause the device to:
store a set of aggregated MAC protocol data unit (AMPDU) size constraint statistics for the MCS of the station associated with head-of-line blocking.

18. The non-transitory computer-readable medium of claim 17, wherein the set of AMPDU size constraint statistics are based at least in part on a parameter from the group consisting of:
a statistical packet error rate of the MCS and a maximum AMPDU size of the MCS for a given airtime.

19. The non-transitory computer-readable medium of claim 17, wherein the code is further executable by the processor to cause the device to:
determine the average physical protocol data unit (PPDU) length of the station based on a parameter from the group consisting of: the set of AMPDU size constraint statistics for the MCS, an expected length of a multi-user PPDU frame and a distribution of the AMPDU size constraint statistics for the MCS of the station.

* * * * *